(12) United States Patent
Guo et al.

(10) Patent No.: US 12,557,140 B2
(45) Date of Patent: Feb. 17, 2026

(54) COMMUNICATION METHOD BASED ON NONSIMULTANEOUS TRANSMIT AND RECEIVE MULTI-LINK DEVICE, AND APPARATUS

(71) Applicant: Huawei Technologies Co., Ltd., Shenzhen (CN)

(72) Inventors: Yuchen Guo, Shenzhen (CN); Ming Gan, Shenzhen (CN); Yunbo Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 493 days.

(21) Appl. No.: 17/981,857

(22) Filed: Nov. 7, 2022

(65) Prior Publication Data

US 2023/0082270 A1   Mar. 16, 2023

Related U.S. Application Data

(63) Continuation of application No. PCT/CN2021/091558, filed on Apr. 30, 2021.

(30) Foreign Application Priority Data

May 8, 2020   (CN) .......................... 202010384061.8

(51) Int. Cl.
*H04W 74/0816*   (2024.01)
*H04L 5/00*   (2006.01)
*H04W 76/15*   (2018.01)

(52) U.S. Cl.
CPC ....... *H04W 74/0816* (2013.01); *H04L 5/0048* (2013.01); *H04W 76/15* (2018.02)

(58) Field of Classification Search
None
See application file for complete search history.

(56) References Cited

U.S. PATENT DOCUMENTS

| 2010/0316150 | A1 | 12/2010 | Amini et al. |
| 2013/0260801 | A1 | 10/2013 | Kim et al. |
| 2019/0335454 | A1 | 10/2019 | Huang et al. |

(Continued)

FOREIGN PATENT DOCUMENTS

| CN | 109547945 A | 3/2019 |
| CN | 112492682 A | 3/2021 |

(Continued)

OTHER PUBLICATIONS

Guo, J., et al., "Multi Link Group Addressed Frame delivery for non-STR MLD", doc.: IEEE 802.11-20/0761R0, Apr. 23, 2020, 14 Pages.

(Continued)

*Primary Examiner* — Walter J Divito
(74) *Attorney, Agent, or Firm* — Slater Matsil, LLP

(57) ABSTRACT

A communication method, includes: a first station in a multi-link station device obtain a channel on a first link through contention, and obtain a transmit opportunity (TXOP) on the first link; and the first station ends the TXOP before target sending time of a beacon frame of a second station, wherein the first station and the second station are stations of the multi-link station device, and when the first station performs sending or receiving, the second station is not capable of performing receiving or sending.

15 Claims, 21 Drawing Sheets

(56) References Cited

U.S. PATENT DOCUMENTS

2021/0076413 A1\* 3/2021 Lu .......................... H04W 76/15
2023/0120236 A1\* 4/2023 Jang .................. H04W 74/0816
370/329

FOREIGN PATENT DOCUMENTS

JP 6272951 B2 1/2018
KR 20130028683 A 3/2013

OTHER PUBLICATIONS

Ho, D., et al., "MLA: Non-STR STA Behaviors", doc.: IEEE 802.11-20/0444R0, Mar. 14, 2020, 6 Pages.
Akhmetov, D., et al., "Performance aspects of Multi-link operations with constraints", doc.: IEEE 802.11-19/1541r1, Nov. 11, 2019, 21 Pages.
Jang, I., et al., "Considerations for Multi-link Channel Access without Simultaneous TX/RX Capability", doc.: IEEE 802.11-19/1917r1, Nov. 11, 2019, 19 Pages.

\* cited by examiner

COMMUNICATION METHOD BASED ON NONSIMULTANEOUS TRANSMIT AND RECEIVE MULTI-LINK DEVICE, AND APPARATUS

CROSS-REFERENCE TO RELATED APPLICATIONS

This application is a continuation of International Application No. PCT/CN2021/091558, filed on Apr. 30, 2021, which claims priority to Chinese Patent Application No. 202010384061.8, filed on May 8, 2020. The disclosures of the aforementioned applications are herein incorporated by reference in their entireties.

TECHNICAL FIELD

This application relates to the field of wireless communication technologies, and in particular, to a communication method based on a nonsimultaneous transmit and receive multi-link device, and an apparatus

BACKGROUND

With the development of wireless technologies, more wireless devices support multi-link communication, for example, simultaneously performing communication on a 2.4 GHz frequency band, a 5 GHz frequency band, and a 6 GHz frequency band, or simultaneously performing communication on different channels on a same frequency band. In this way, a communication rate between the devices is improved. This device is generally referred to as a multi-link device (MLD).

The multi-link device generally includes a plurality of stations (STAs), and each STA works on a specific frequency band or a channel. The multi-link device may be an access point device, or may be a station device. If the multi-link device is the access point device, the access point device includes one or more access points (APs). If the multi-link device is the station device, the station device includes one or more non-AP STAs. The one or more non-AP STAs in the station device may communicate with the one or more APs in the access point device after an association relationship is established between the non-AP STAs and the APs.

A nonsimultaneous transmit and receive (NSTR) multi-link device (MLD) means that when performing sending on one link, the multi-link device cannot perform receiving on the other link. A reason for which the multi-link device cannot perform receiving is generally that when the multi-link device performs sending on one link, energy for sending is leaked to the other link, self-interference is generated, and due to the self-interference, the device cannot correctly demodulate, on the other link, a data packet that needs to be received.

For the NSTR MLD, when the NSTR MLD sends data on one link, interference to data receiving traffic on the other link may be caused because the NSTR MLD ignores information on the other link. Therefore, a technical problem to be resolved in this application is how a link on which data is being sent or is to be sent learns of information about the other link, to avoid channel interference, caused by the link, to data receiving on the other link.

SUMMARY

Embodiments of this application provide a communication method that is based on a nonsimultaneous transmit and receive multi-link device, and an apparatus, to reduce a latency of accessing a channel on a nonsimultaneous transmit and receive link in a multi-link device.

According to a first aspect, a groupcast traffic indication method in a multi-link device is provided. The method includes: A multi-link access point device generates a first beacon frame that carries groupcast indication information, where the groupcast indication information is used to indicate a station that has to-be-received groupcast traffic; and the multi-link access point device sends the first beacon frame.

In a possible design, the first beacon frame includes a first information element, and a bitmap control field and a partial virtual bitmap field in the first information element are used to indicate the station that has the to-be-received groupcast traffic.

In a possible design, the first beacon frame includes a second information element, and a groupcast identifier list in the second information element is used to indicate the station that has the to-be-received groupcast traffic.

In a possible design, the first beacon frame further includes broadcast indication information, used to indicate whether there is to-be-received broadcast traffic.

In a possible design, a broadcast indication field included in the first information element or the second information element is used to indicate whether there is the to-be-received broadcast traffic.

In a possible design, the method further includes: A second access point in the multi-link access point device stops sending a first message to a second station, where the first message is a message that needs to be responded to by the second station.

In a possible design, the multi-link access point device generates a second beacon frame, where a target wake time TWT information unit of the second beacon frame carries TWT-type indication information, and the TWT-type indication information is used to indicate whether a service period specified by the TWT information unit is used to transmit groupcast traffic and/or broadcast traffic; and the multi-link access point device sends the second beacon frame on a first link.

In a possible design, the TWT information unit is included in the first beacon frame.

In a possible design, the service period indicated by the TWT information unit sent by the multi-link access point device on the first link is the same as a service period indicated by a TWT information unit sent on a second link.

In a possible design, the TWT information unit sent by the multi-link access point device on the first link is further used to determine a service period for transmitting the groupcast traffic and/or the broadcast traffic on a second link.

According to a second aspect, a groupcast traffic indication method in a multi-link device is provided. The method includes: A multi-link station device receives a first beacon frame; and if the multi-link station device has to-be-received groupcast traffic, stops channel contention of a second station that is not capable of performing sending or receiving when a first station performs receiving or sending.

In a possible design, the first beacon frame includes a first information element, and a bitmap control field and a partial virtual bitmap field in the first information element are used to indicate the station that has the to-be-received groupcast traffic.

In a possible design, the first beacon frame includes a second information element, and a groupcast identifier list in the second information element is used to indicate the station that has the to-be-received groupcast traffic.

In a possible design, the first beacon frame further includes broadcast indication information, used to indicate whether there is to-be-received broadcast traffic.

In a possible design, a broadcast indication field included in the first information element or the second information element is used to indicate whether there is the to-be-received broadcast traffic.

In a possible design, the multi-link station device receives a second beacon frame, and if the first station in the multi-link station device has the to-be-received groupcast traffic and/or the to-be-received broadcast traffic in a service period, stops channel contention of the second station that is not capable of performing sending or receiving when the first station performs receiving or sending.

In a possible design, a TWT information unit is included in the first beacon frame.

According to a third aspect, a communication apparatus is provided, used in a first multi-link access point device. The apparatus includes:

a processing unit, configured to generate a first beacon frame that carries groupcast indication information, where the groupcast indication information is used to indicate a station that has to-be-received groupcast traffic; and a transceiver unit, configured to send the first beacon frame.

In a possible design, the processing unit is further configured to stop sending a first message to a second station, where the first message is a message that needs to be responded to by the second station.

In a possible design, the processing unit is further configured to generate a second beacon frame, where a target wake time TWT information unit of the second beacon frame carries TWT-type indication information, and the TWT-type indication information is used to indicate whether a service period specified by the TWT information unit is used to transmit groupcast traffic and/or broadcast traffic; and the transceiver unit is further configured to send the second beacon frame on a first link.

According to a fourth aspect, a communication apparatus is provided, used in a first multi-link station device. The apparatus includes:

a transceiver unit, configured to receive a first beacon frame, where the first beacon frame carries groupcast indication information, used to indicate a station that has to-be-received groupcast traffic; and a processing unit, configured to: if the multi-link station device has the to-be-received groupcast traffic, stop channel contention of a second station that is not capable of performing sending or receiving when a first station performs receiving or sending.

In a possible design, the transceiver unit is further configured to receive a second beacon frame; and if the first station in the multi-link station device has the to-be-received groupcast traffic and/or to-be-received broadcast traffic in a service period, stop channel contention of the second station that is not capable of performing sending or receiving when the first station performs receiving or sending.

According to a fifth aspect, a communication apparatus is provided, including at least one processor, where the at least one processor is coupled to at least one transceiver.

The at least one processor is configured to execute a computer program or instructions, to enable the apparatus to perform the method according to any one of the first aspect, or enable the apparatus to perform the method according to any one of the second aspect.

The transceiver is configured to support the apparatus in performing the method in any one of the first aspect or the possible implementations of the first aspect, or performing the method in any one of the second aspect or the possible implementations of the second aspect.

In another possible design, a structure of the apparatus may further include a memory. The processor is coupled to the memory, and may be configured to execute computer program instructions stored in the memory, to enable the apparatus to perform the method in any one of the first aspect or the possible implementations of the first aspect, or perform the method in any one of the second aspect or the possible implementations of the second aspect.

The communication apparatus in the fifth aspect may be a chip, where the processor may be a processing circuit of the chip, and the transceiver may be an input/output interface circuit. The processing circuit may be configured to process signaling or data information provided by the input/output interface circuit, and the input/output interface circuit may be configured to input/out data or signaling information for the chip.

According to a sixth aspect of the embodiments of this application, a computer-readable storage medium is provided. The computer-readable storage medium stores computer program code, and when the computer program code is run on a processor, the processor is enabled to perform the method in any one of the first aspect or the possible implementations of the first aspect, or perform the method in any one of the second aspect or the possible implementations of the second aspect.

According to a seventh aspect of the embodiments of this application, a computer program product is provided. The program product stores computer software instructions executed by a foregoing processor, and the computer software instructions include a program used to perform the solution in any one of the foregoing aspects.

According to an eighth aspect of the embodiments of this application, a communication apparatus is provided. The apparatus includes a processor, and may further include a transceiver and a memory. The transceiver is configured to receive and send information, or configured to communicate with another network element. The memory is configured to store computer-executable instructions. The processor is configured to execute the computer-executable instructions, to support the communication apparatus in implementing the method in any one of the foregoing aspects.

According to a ninth aspect of the embodiments of this application, a communication apparatus is provided. The apparatus may exist in a product form of a chip. A structure of the apparatus includes a processor, and may further include a memory. The memory is configured to be coupled to the processor to store program instructions and data that are necessary for the apparatus. The processor is configured to execute the program instructions stored in the memory, to support the communication apparatus in performing the method in any one of the foregoing aspects.

According to a tenth aspect of the embodiments of this application, a communication apparatus is provided. The apparatus may exist in a product form of a chip. A structure of the apparatus includes a processor and an interface circuit. The processor is configured to communicate with another apparatus through a receiving circuit, to enable the apparatus to perform the method in any one of the foregoing aspects.

BRIEF DESCRIPTION OF THE DRAWINGS

To describe the technical solutions in embodiments of this application more clearly, the following briefly describes the accompanying drawings that need to be used in the embodiments.

DETAILED DESCRIPTION OF ILLUSTRATIVE EMBODIMENTS

The following describes the technical solutions in embodiments of this application with reference to the accompanying drawings in the embodiments of this application.

Figure 1A:
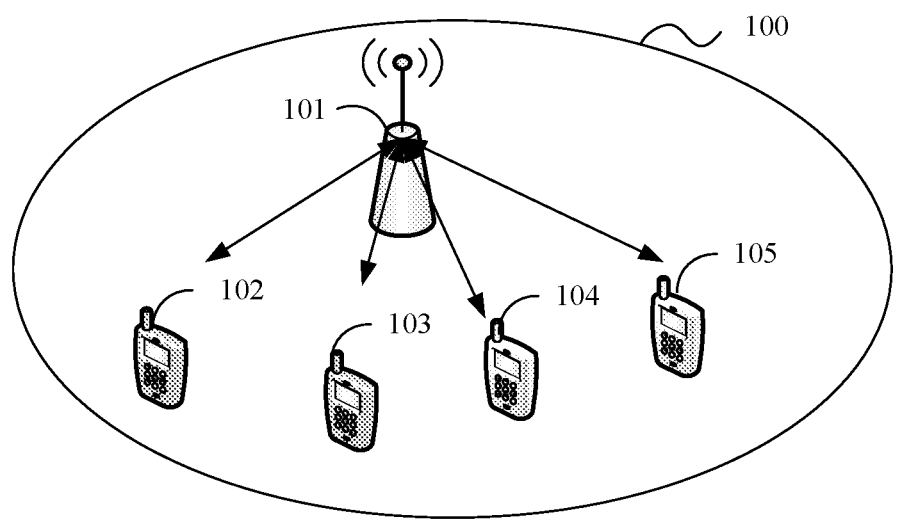
FIG. 1A shows a wireless local area network communication system according to an embodiment of this application.

FIG. 1A shows a wireless local area network (WLAN) communication system 100. The communication system 100 includes an access point device 101, and a station device 102 or a plurality of station devices (for example, station devices 102, 103, 104, and 105). Both the access point device and the station device support a WLAN communication protocol. The communication protocol may include IEEE 802.11e (which is also referred to as Wi-Fi 7 or an EHT protocol), and may further include protocols such as IEEE 802.11ax and IEEE 802,11ac. Certainly, with the continuous evolution and development of communication technologies, the communication protocol may further include a next-generation protocol of IEEE 802.11be, and the like. Using a WLAN as an example, an apparatus for implementing a method in this application may be an access point device or a station device in the WLAN, or may be a chip or a processing system installed in an access point device or a station device.

The access point device is an apparatus having a wireless communication function, supports communication performed by using a WLAN protocol, has a function of communicating with another device (for example, the station device or another access point device) in the WLAN network, and certainly may further have a function of communicating with another device. In a WLAN system, the access point device may be referred to as an access point station device. The apparatus may be a completely-built device, or may be a chip, a processing system, or the like installed in a completely-built device. The device in which the chip or the processing system is installed may implement the method or a function in the embodiments of this application under control of the chip or the processing system. An AP in the embodiments of this application is an apparatus for providing traffic for a STA, and may support an 802.11 series protocol. For example, the access point device may be a communication entity such as a communication server, a router, a switch, or a bridge. The access point device may include various forms of macro base stations, micro base stations, relay stations, and the like. Certainly, the access point device may alternatively be a chip or a processing system in the various forms of devices, to implement the method or the function in the embodiments of this application.

The station device is an apparatus having a wireless communication function, supports communication performed by using a WLAN protocol, and has a capability of communicating with another station device or the access point device in the WLAN network. In the WLAN system, the station device may be referred to as a non-access-point station device. For example, the station device is any user communication device that allows a user to communicate with an access point device and further communicate with the WLAN. The apparatus may be a completely-built device, or may be a chip, a processing system, or the like installed in a completely-built device. The device in which the chip or the processing system is installed may implement the method or the function in the embodiments of this application under control of the chip or the processing system. For example, the station device may be user equipment that can be connected to a network, for example, a tablet, a desktop computer, a laptop computer, a notebook computer, an ultra-mobile personal computer (UMPC), a handheld computer, a netbook, a personal digital assistant (PDA), or a mobile phone, or may be an Internet of Things node in an Internet of Things, a vehicle-mounted communication apparatus in an Internet of Vehicles, an entertainment device, a game device or system, or a global positioning system device. The station device may alternatively be a chip or a processing system in the foregoing terminals.

The WLAN system can provide high-rate and low-delay transmission. With the continuous evolution of a WLAN application scenario, the WLAN system will be applied to more scenarios or industries, for example, is applied to an Internet of Things industry, an Internet of Vehicles industry, a banking industry, an enterprise office, a stadium venue, a concert hall, a hotel room, a dormitory, a ward, a classroom, a supermarket, a square, a street, a production plant, or a warehouse. Certainly, a device (such as the access point or the station) that supports WLAN communication may be a sensor node (for example, a smart water meter, a smart electricity meter, or a smart aerial detection node) in a smart city, a smart device (for example, a smart camera, a projector, a display, a television set, a speaker, an electric refrigerator, or a washing machine) in a smart home, a node in an Internet of Things, an entertainment terminal (for example, a wearable device such as AR or VR), a smart device (for example, a printer, a projector, a loudspeaker, or a speaker) in a smart office, an Internet of Vehicles device in an Internet of Vehicles, an infrastructure (for example, a vending machine, a self-service guiding device in a supermarket, a self-service cash register, or a self-service ordering device) in a daily-life scenario, a device in a large sport and music venue, or the like. Specific forms of a multi-link access point device and a multi-link station device are not specifically limited in the embodiments of this application, and are only examples for description herein.

Figure 1B:
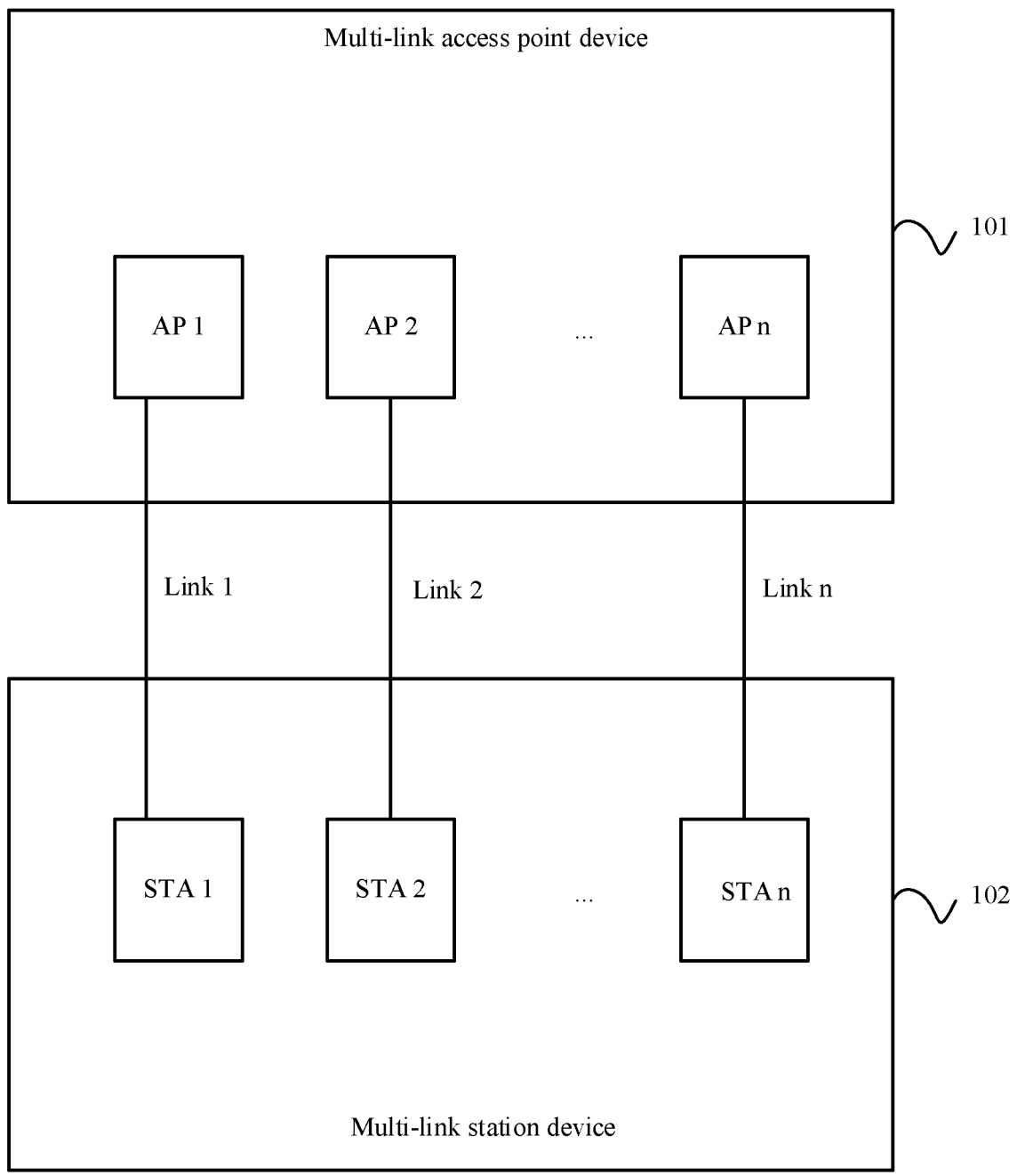
FIG. 1B is a schematic diagram of a connection between multi-link devices according to an embodiment of this application.

A device in the embodiments of this application is a multi-link device MLD, and includes a multi-link station device and a multi-link access point device. FIG. 1B is a schematic diagram of a connection between multi-link devices according to an embodiment of this application.

Any station (102, 103, 104, or 105) in FIG. 1A is a multi-link station device 102 in FIG. 1B, and the access point 101 in FIG. 1A is a multi-link access point device 101 in FIG. 1B. The multi-link station device 102 includes one or more stations STAs, or one or more non-access-point stations non-AP STAs, where each STA works on a specific frequency band. The multi-link access point device 101 includes one or more access points APs, where each AP works on a specific frequency band. An association is established between a STA and an AP that work on a same frequency band, to form a link.

Figure 1C:
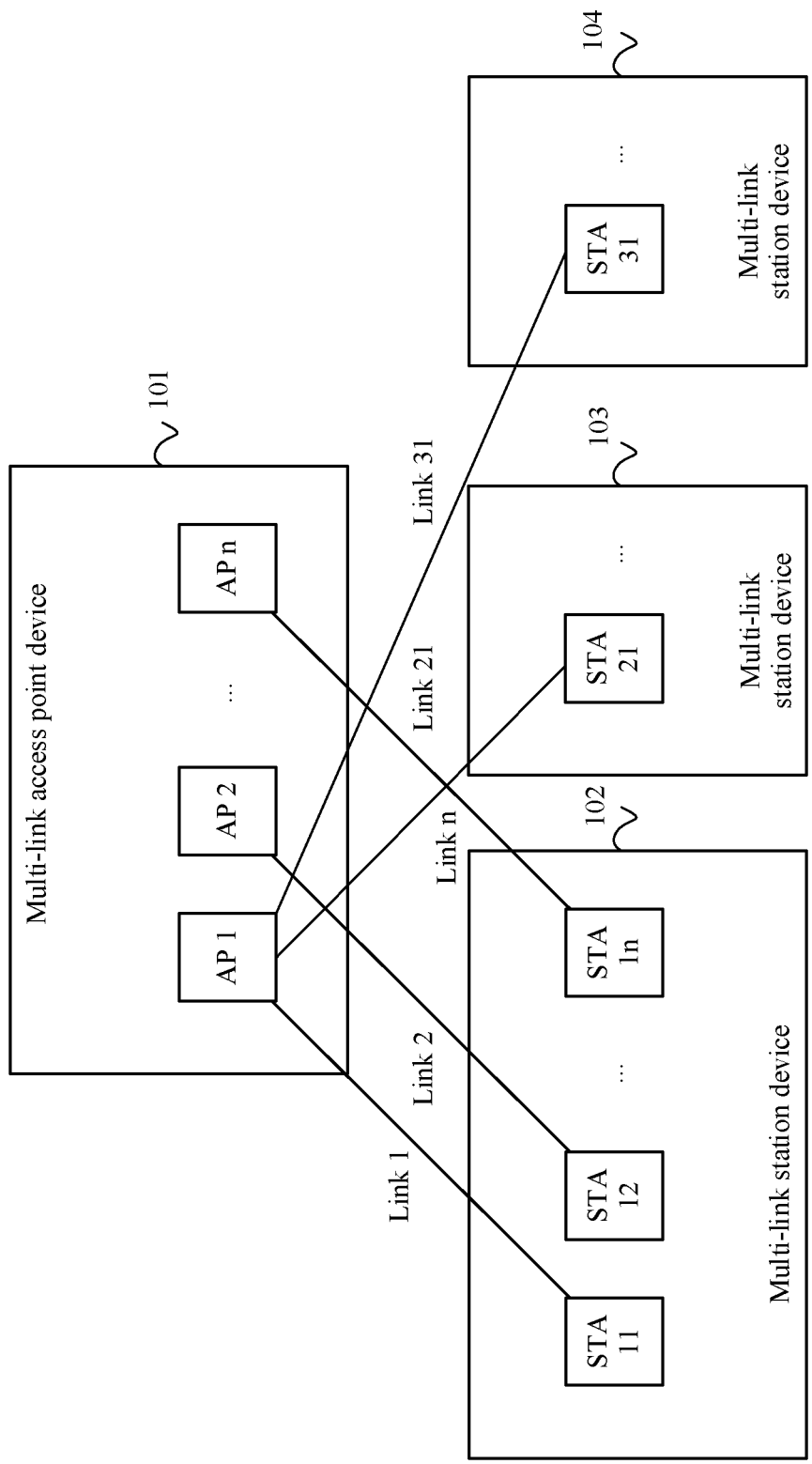
FIG. 1C is another schematic diagram of connections among multi-link devices according to an embodiment of this application.

Further, when a plurality of multi-link station devices communicate with a plurality of multi-link access point devices, an AP and a STA that work on a same frequency band may communicate with each other. FIG. 1C is another schematic diagram of connections among multi-link devices according to an embodiment of this application. As shown in FIG. 1C, the access point device 101 in FIG. 1A may correspondingly be a multi-link access point device, and the station device 102, the station device 103, and the station device 104 in FIG. 1A may correspondingly be multi-link station devices. An AP 1 in the access point device 101 communicates with a STA 11 in the station device 102 on a link 1, and an AP 2 communicates with a STA 12 on a link 2. In addition, the AP 1 communicates with a STA 21 in the station device 103 on a link 21, and communicates with a STA 31 in the station device 104 on a link 31. The link 1, the link 21, and the link 31 are links on a same frequency band.

The multi-link device includes a nonsimultaneous transmit and receive (NSTR) multi-link device (MLD) and a simultaneous transmit and receive (STR) multi-link device (MLD). The STR MLD means that when performing sending on one link, the multi-link device can perform receiving on the other link. The NSTR MLD means that when performing sending on one link, the multi-link device cannot perform receiving on the other link. A reason for which the multi-link device cannot perform receiving is generally that when the multi-link device performs sending on one link, energy for sending is leaked to the other link, self-interference is generated, and due to the self-interference, the device cannot correctly demodulate, on the other link, a data packet that needs to be received.

It should be noted that STR and NSTR are for two links. Therefore, when an MLD supports only two links, whether the MLD is the STR MLD or the NSTR MLD may be directly indicated. When an MLD supports more than two links, whether the MLD supports the STR between any two links needs to be indicated. For example, in FIG. 1C, communication is performed on the link 1 and a link 2 on a 2.4 GHz frequency band, and interference is caused to each other. In this case, the multi-link station device 102 cannot perform sending on one of the link 1 and the link 2 while performing receiving on the other of the link 1 and the link 2 (NSTR), and the link 1 and the link 2 are nonsimultaneous transmit and receive links of the multi-link station device 102. Communication is performed on the link 1 on the 2.4 GHz frequency band, communication is performed on a link 3 on a 6 GHz frequency band, and no interference is caused to each other. In this case, the multi-link station device 102 supports the STR between the link 1 and the link 3, and the link 1 and the link 3 are simultaneous transmit and receive links of the multi-link station device 102.

Figure 2A:
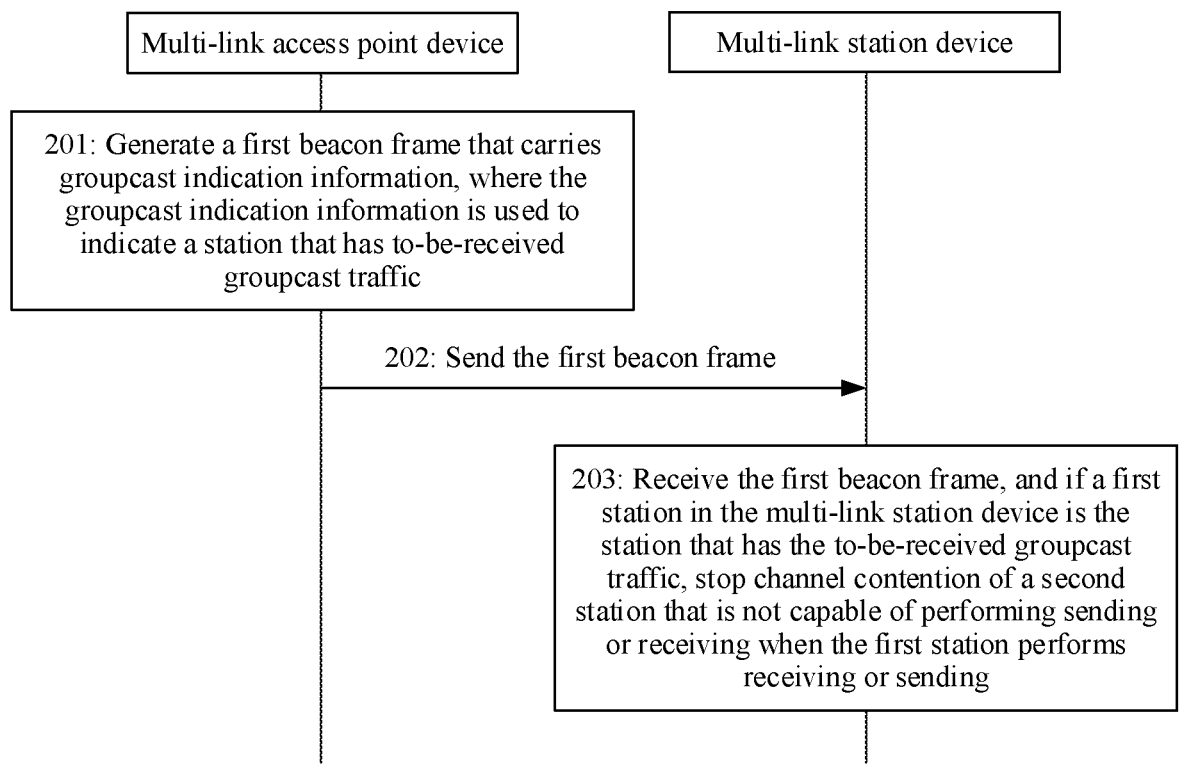
FIG. 2A is a flowchart of a communication method according to an embodiment of this application.

For the NSTR MLD, because information received on a link is missed, sending of data on an NSTR link may cause interference to data receiving on the link. To resolve this problem, FIG. 2A shows a groupcast traffic indication method in a multi-link device according to an embodiment of this application. As shown in FIG. 2A, the method includes the following steps.

201: A multi-link access point device generates a first beacon frame that carries groupcast indication information, where the groupcast indication information is used to indicate a station that has to-be-received groupcast traffic.

202: The multi-link access point device sends the first beacon frame.

203: A multi-link station device receives the first beacon frame, and if a first station in the multi-link station device is the station that has the to-be-received groupcast traffic, stops channel contention of a second station that is not capable of performing sending or receiving when the first station performs receiving or sending.

In this embodiment of this application, the first station and the second station are stations in the multi-link station device, and a first access point and a second access point are access points in the multi-link access point device. For details, refer to FIG. 1C. The first station STA 11 and the second station STA 12 are located in the multi-link station device 102, and the first access point AP 1 and the second access point AP 2 are located in the multi-link access point device 101. Communication is performed between the AP 1 and the STA 11 on a first link (the link 1), and communication is performed between the AP 2 and the STA 12 on a second link (the link 2). The multi-link station device 102 is an NSTR MLD. In addition, when the STA 11 performs receiving on the link 1, the STA 12 cannot perform sending on the link 2, or when the STA 11 performs sending on the link 1, the STA 12 cannot perform receiving on the link 2. That is, the link 1 and the link 2 are nonsimultaneous transmit and receive links of the multi-link station device.

In this case, when the first access point in the multi-link access point device sends the first beacon frame on the first link, and the first beacon frame indicates that the first station has the to-be-received groupcast traffic, the channel contention of the second station is stopped in both a period in which the first station receives the first beacon frame and a period in which the first station receives a groupcast frame. That the channel contention of the second station on the second link is stopped may be uniformly scheduled by the multi-link station device. Alternatively, the second station may determine, based on a to-be-received status of the groupcast traffic and/or a to-be-received status of broadcast traffic on the first link, whether to stop the channel contention and time for stopping the channel contention (and time for restarting the channel contention).

Figure 2B:
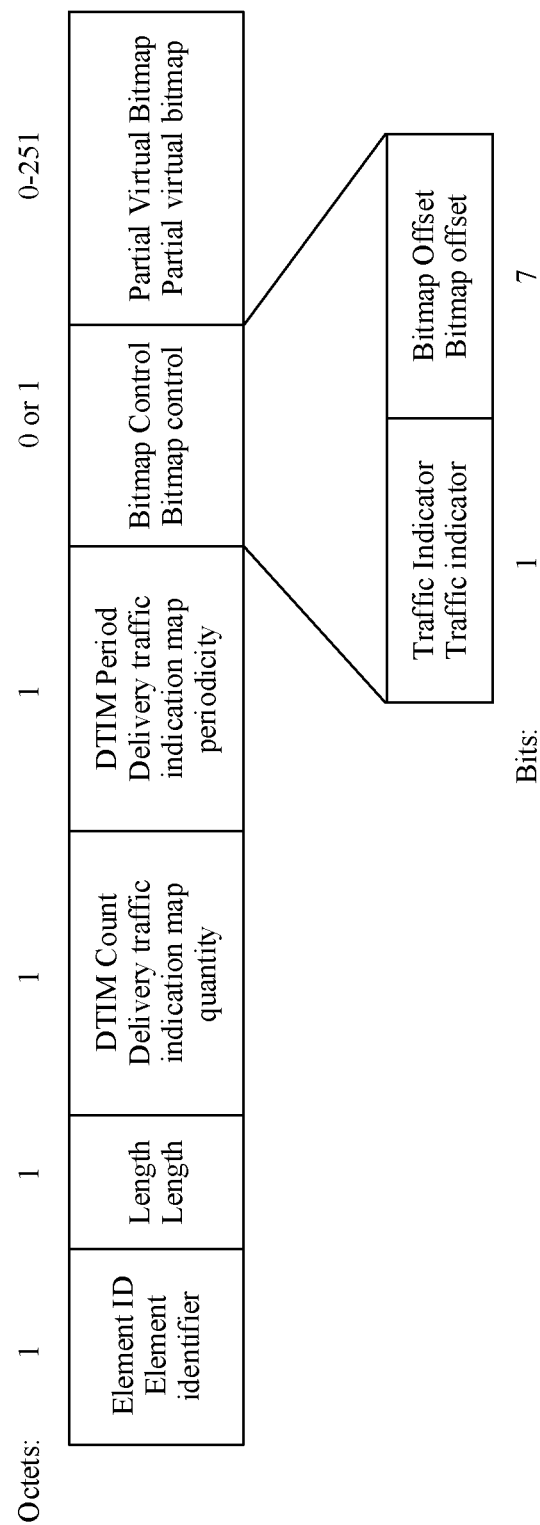
FIG. 2B is a schematic diagram of a beacon frame according to an embodiment of this application.

The multi-link access point device may send a beacon frame (Beacon) to the multi-link station device through the first link, where the beacon frame may carry a traffic indication map (TIM) element, used to indicate whether the first access point has to-be-sent groupcast traffic and/or to-be-sent broadcast traffic on the first link. FIG. 2B is a schematic diagram of a beacon frame according to an embodiment of this application. As shown in FIG. 2B, a TIM element in the beacon frame includes a bitmap control field (Bitmap Control), where a quantity of octets corresponding to the field may be 0 or 1. When the quantity of octets is 1, the bitmap control field includes eight bits, where a one-bit traffic indicator is used to indicate whether there is to-be-sent groupcast traffic and/or to-be-sent broadcast traffic. If one of the groupcast traffic or the broadcast traffic is to be sent, a value of the traffic indicator field is 1. If neither of the two pieces of traffic is to be sent, the value of the traffic indicator field is 0. The groupcast traffic is traffic for a part of stations (not all stations) communicating with an access point, and the broadcast traffic is traffic for all the stations communicating with the access point. A seven-bit bitmap offset field (Bitmap Offset) in the bitmap control field is used to be combined with a partial virtual bitmap field (Partial Virtual Bitmap), to indicate whether a STA has to-be-received unicast traffic.

In this case, because both the groupcast traffic and the broadcast traffic are indicated by using the traffic indicator field, when the value of the field is 1, whether the first station has the to-be-received broadcast traffic or the to-be-received groupcast traffic on the first link cannot be determined. In addition, when the traffic indicator field indicates that there is the to-be-received groupcast traffic, because the first access point may notify, to all stations that can communicate with the first access point in the multi-link station device, a to-be-received status of the groupcast traffic, the first station receiving the beacon frame cannot determine, based on the traffic indicator field, whether the first station is in a group that needs to receive the groupcast traffic. For example, in FIG. 1C, the AP 1 can simultaneously send a Beacon to the STA 11, the STA 21, and the STA 31, to indicate that there is to-be-received groupcast traffic. After the STA 11 receives the Beacon, it is assumed that the STA 11 determines, based on that the value of the traffic indicator field is 1, that the AP 1 has to-be-sent groupcast traffic. However, the STA 11 cannot determine whether the groupcast traffic is groupcast traffic for the STA 11. In this case, to ensure that no interference is caused to data receiving on the link 1, the STA 11 has to notify the STA 12 on the link 2 to stop channel contention (where the first multi-link station device is non-STR on the link 1 and the link 2). However, the groupcast traffic is actually for the STA 21 and the STA 31. In this case, the channel contention on the link 2 is actually delayed, and a channel access latency is increased.

Optionally, the first beacon frame includes a first information element, and a bitmap control field and a partial virtual bitmap field in the first information element are used to indicate the station that has the to-be-received groupcast traffic.

Figure 2C:
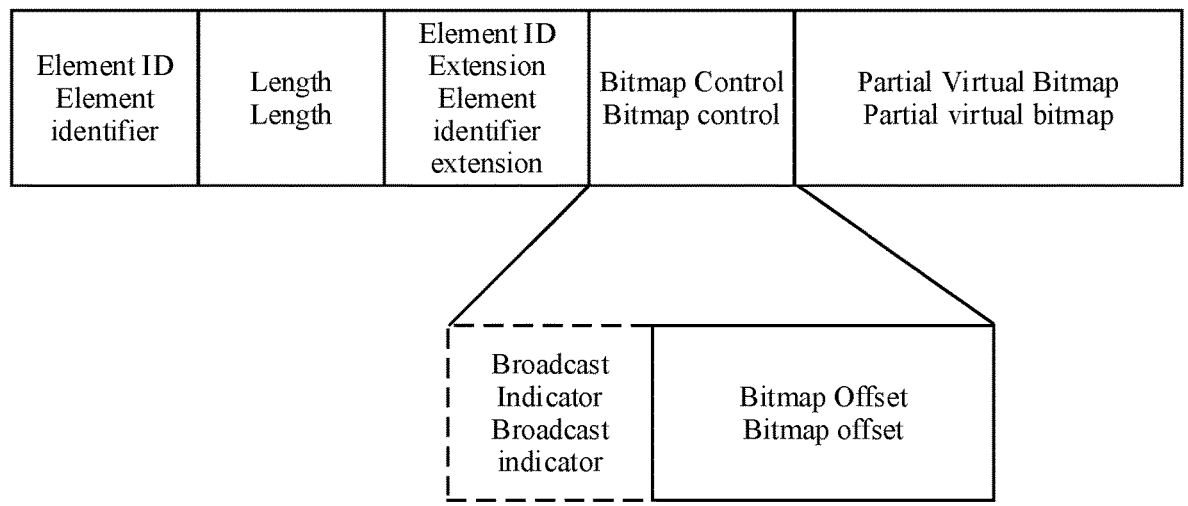
FIG. 2C is a schematic diagram of a frame structure of a first information element according to an embodiment of this application.

In this embodiment of this application, the multi-link access point device sends the first beacon frame to the multi-link station device, where the first beacon frame carries the groupcast indication information, specifically used to indicate the station that has the to-be-received groupcast traffic. The first station is prevented from prompting, due to the groupcast traffic in which the first station does not participate, to stop the channel contention of the second station. The groupcast indication information may be specifically carried in the first information element. The first information element may be referred to as a groupcast traffic indication map (GTIM) element or a multicast traffic indication map (MTIM) element. FIG. 2C is a schematic diagram of a frame structure of a first information element according to an embodiment of this application. As shown in FIG. 2C, a value of an element identifier field and a value of an element identifier extension field in the frame structure may be used to indicate whether an information unit is a GTIM information unit or an MTIM information unit. A partial virtual bitmap field includes a plurality of bits, where each bit is used to indicate whether a STA has to-be-received groupcast traffic. Generally, when a value of the bit is 0, it indicates that the corresponding STA has no to-be-received groupcast traffic, and when the value of the bit is 1, it indicates that the corresponding STA has the to-be-received groupcast traffic. Alternatively, when a value of the bit is 1, it indicates that the corresponding STA has the to-be-received groupcast traffic, or when the value of the bit is a default value, it indicates that the corresponding STA has no to-be-received groupcast traffic. Alternatively, when a value of the bit is 0, it indicates that the corresponding STA has no to-be-received groupcast traffic, or when the value of the bit is a default value, it indicates that the corresponding STA has the to-be-received groupcast traffic.

Optionally, a correspondence between each bit and the STA may be determined by a bitmap offset field in a bitmap control field. A specific determining method may be as follows.

Figure 2D:
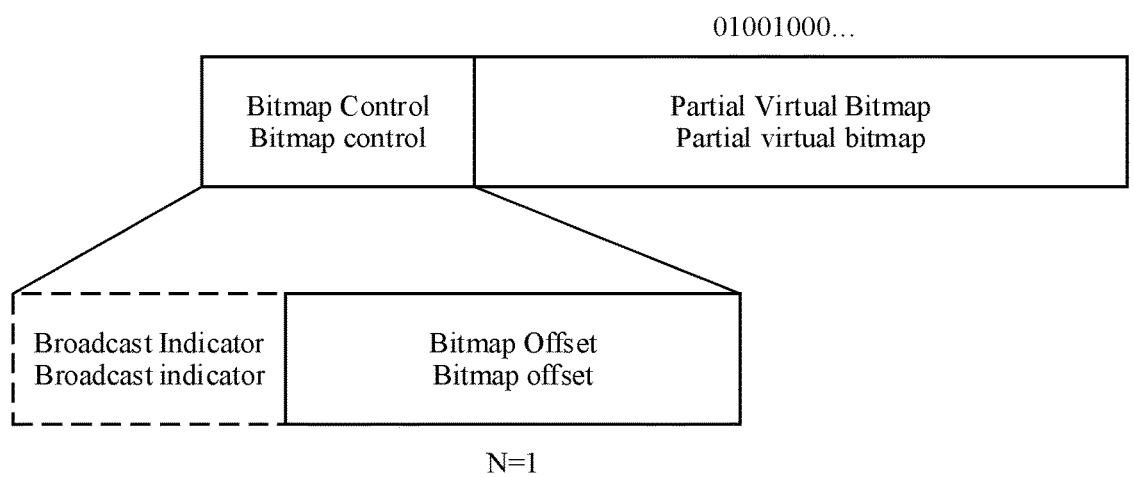
FIG. 2D is a schematic diagram of indicating whether a STA has to-be-received groupcast traffic according to an embodiment of this application.

N1 is first determined, where N1 is a largest positive even number (which may alternatively be 0) that satisfies the following condition: STAs whose AIDs range from 1 to (N1*8)-1 have no to-be-received groupcast traffic. The AID represents a number of a STA that communicates with an AP 1, and is an integer greater than 1. A value of the bitmap offset field is (N1)/2. The $1^{st}$ bit in the partial virtual bitmap field indicates whether a STA whose AID is N1*8 (or a value obtained after the value of the bitmap offset field is multiplied by 16) has the to-be-received groupcast traffic. Specifically, FIG. 2D is a schematic diagram of indicating whether a STA has to-be-received groupcast traffic according to an embodiment of this application. As shown in FIG. 2D, values of AIDs ranging from 1 to 15 are all 0. That is, STAs whose AIDs range from 1 to 15 have no to-be-received groupcast traffic. In this case, it may be determined that N1=2, a value N of a bitmap offset field is (N1)/2=1, and a field in a partial virtual bitmap field indicates to-be-received statuses of groupcast traffic corresponding to STAs starting from a STA whose AID=16. That is, a STA 17 has no to-be-received groupcast traffic, a STA 18 has the to-be-received groupcast traffic, and the rest can be deduced by analogy.

It should be noted that the value N of the bitmap offset field is (N1)/2. A reason for which N1 is divided by 2 is that a value range of N1 is [0,251], which corresponds to 252 octets. A bitmap control field corresponds to one octet, where 1 bit corresponds to a broadcast indication field, and 7 bits correspond to the bitmap offset field. However, a range that can be indicated by the 7 bits is [0, 127], which is insufficient to cover [0, 251]. Therefore, N1 is divided by 2. Optionally, the bitmap offset field may be represented by using 8 bits. In this case, the value N of the bitmap offset field is N1. Alternatively, the bitmap offset field may be used to indicate an AID of the $1^{st}$ STA that has the to-be-received groupcast traffic. That is, for example, in FIG. 2D, the value N of the bitmap offset field is 16.

In this embodiment of this application, the first information element and the TIM element may be sequentially sent by using a same beacon frame or different beacon frames. The station may determine, based on an element identifier, whether the element is an element for groupcast traffic or an element for other traffic (for example, unicast traffic). For example, an identifier of a TIM element in a beacon frame is MX001, and an element identifier of a first information element in the same beacon frame is MC001, or the like. Alternatively, whether the first information element is the element for the groupcast traffic or the element for the unicast traffic may be determined with reference to an element identifier and an element identifier extension. For example, an identifier of the TIM element is MX001, an element identifier of the first information element may be MX001, and the element identifier extension may be G01. The station determines a to-be-received status of the groupcast traffic based on the received first information element, and determines a to-be-received status of the other traffic based on the TIM element.

Optionally, the first beacon frame includes a second information element, and a groupcast list field in the second information element is used to indicate the station that has the to-be-received groupcast traffic.

Figure 2E:
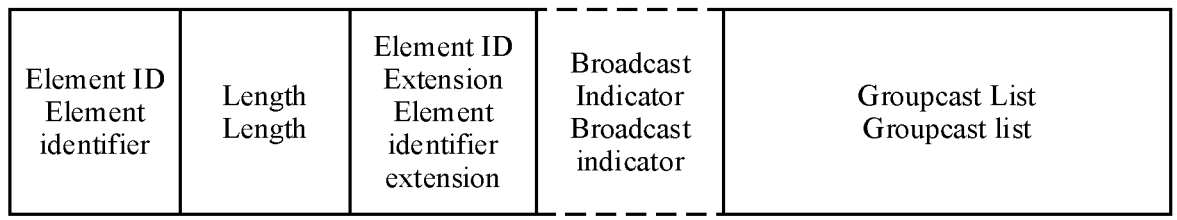
FIG. 2E is another schematic diagram of a frame structure of a first information element according to an embodiment of this application.

Specifically, FIG. 2E is another schematic diagram of a frame structure of a second information element according to an embodiment of this application. As shown in FIG. 2E, a first beacon frame includes the second information element. The second information element includes a groupcast identifier list, and the list may include a MAC address of a station that needs to receive groupcast traffic, an association identifier (AID) of a station that needs to receive groupcast traffic, or another unique identifier of a station. As shown in Table 1, the list may alternatively include a groupcast MAC address.

TABLE 1

| Groupcast MAC address |
| --- |
| Address 1 (STA 11, STA 21) |
| Address 2 (STA 21, STA 31) |
| Address 3 (STA 31, STA 11) |

Table 1 includes three groupcast addresses. The stations in the parentheses represent receiving stations corresponding to the groupcast traffic, where the receiving stations may be explicitly indicated. That is, the groupcast MAC address is sent to all stations that can communicate with a first access point, and a first station determines, based on the groupcast MAC address, whether the first station has the to-be-received groupcast traffic. Specifically, the first station determines, based on whether a groupcast MAC address list includes a groupcast MAC address of the first station, whether the first station has the to-be-received groupcast traffic. Alternatively, the receiving stations corresponding to the groupcast MAC address may be implicitly indicated. The first access point sends the groupcast MAC address to only a station that needs to receive the groupcast traffic, and the first station determines, based on whether the groupcast MAC address is received, whether the first station has the to-be-received groupcast traffic.

It can be learned that, in this embodiment of this application, a correspondence between the groupcast traffic and the station is indicated by using the groupcast indication information, to determine whether the first station has the to-be-received groupcast traffic, so that the multi-link station device determines, based on the to-be-received status of the groupcast traffic of the first station, whether to stop the channel contention of the second station on the nonsimultaneous transmit and receive link, thereby improving accuracy of channel contention determining, and avoiding an unnecessary channel access latency.

Optionally, the first beacon frame further includes broadcast indication information, used to indicate whether there is to-be-received broadcast traffic.

It should be understood that the foregoing method is further applicable to the broadcast traffic. That is, the multi-link access point device generates the first beacon frame that carries the broadcast indication information, and if the first station in the multi-link station device is a station that has the to-be-received broadcast traffic, stops the channel contention of the second station that is not capable of performing sending or receiving when the first station performs receiving or sending. The multi-link access point device sends a beacon frame to the multi-link station device, to indicate the station that has the to-be-received groupcast traffic/the to-be-received broadcast traffic. If the first station in the multi-link station device is the station that has the to-be-received groupcast traffic/the to-be-received broadcast traffic, the channel contention of the second station that is not capable of performing sending or receiving when the first station performs receiving or sending needs to be stopped.

Specifically, the first beacon frame may further carry the broadcast indication information used to indicate whether the first station has the to-be-received broadcast traffic, and the broadcast indication information used to indicate the broadcast traffic and the groupcast indication information used to indicate the groupcast traffic correspond to different fields. The broadcast indication information may be carried in the first information element or the second information element, and the to-be-received status of the broadcast traffic and the to-be-received status of the groupcast traffic may be simultaneously indicated by using the first information element or the second information element. Specifically, the indication information of the broadcast traffic may be carried in a corresponding broadcast indication field in FIG. 2C or a corresponding broadcast indication field in FIG. 2E. The field is used to indicate whether there is the to-be-received broadcast traffic. For example, when there is the to-be-received broadcast traffic, a value of the field is 1, and when there is no to-be-received broadcast traffic, the value of the field is 0. Alternatively, when there is the to-be-received broadcast traffic, a value of the field is 1, and when there is no to-be-received broadcast traffic, the value of the field is a default value. Alternatively, when there is the to-be-received broadcast traffic, a value of the field is a default value, and when there is no to-be-received broadcast traffic, the value of the field is 0. In this way, the broadcast traffic and the groupcast traffic can be separately indicated. When the multi-link station device receives the broadcast indication information on the first link, and determines that the first station has the to-be-received broadcast traffic, the channel contention of the second station on the NSTR second link is stopped. Alternatively, if an importance degree or a priority of the broadcast traffic is low, the channel contention of the second station may not be stopped.

It can be learned that, in this embodiment of this application, the first beacon frame carries the indication information of groupcast traffic and/or the indication information of broadcast traffic. If the first station in the multi-link station device is the station that has the to-be-received groupcast traffic/the to-be-received broadcast traffic, the channel contention of the second station that is not capable of performing sending or receiving when the first station performs receiving or sending needs to be stopped, so that receiving of the groupcast traffic/the broadcast traffic by the first station on the first link is not affected.

The multi-link station device receives the first beacon frame through the first link. If it is determined, based on the groupcast indication information in the first beacon frame, that the first station on the first link has the to-be-received groupcast traffic, the channel contention of the second station that is not capable of performing sending or receiving when the first station performs receiving or sending is stopped. That is, the second station stops sending data or a response message to a second access point. Optionally, after the channel contention of the second station is stopped, the groupcast traffic indication method in the multi-link device further includes the following steps.

204a: The first station in the multi-link station device receives the groupcast traffic.

205a: After determining that the first station completes receiving of the groupcast traffic, the multi-link station device restarts the channel contention of the second station.

Figure 2F:
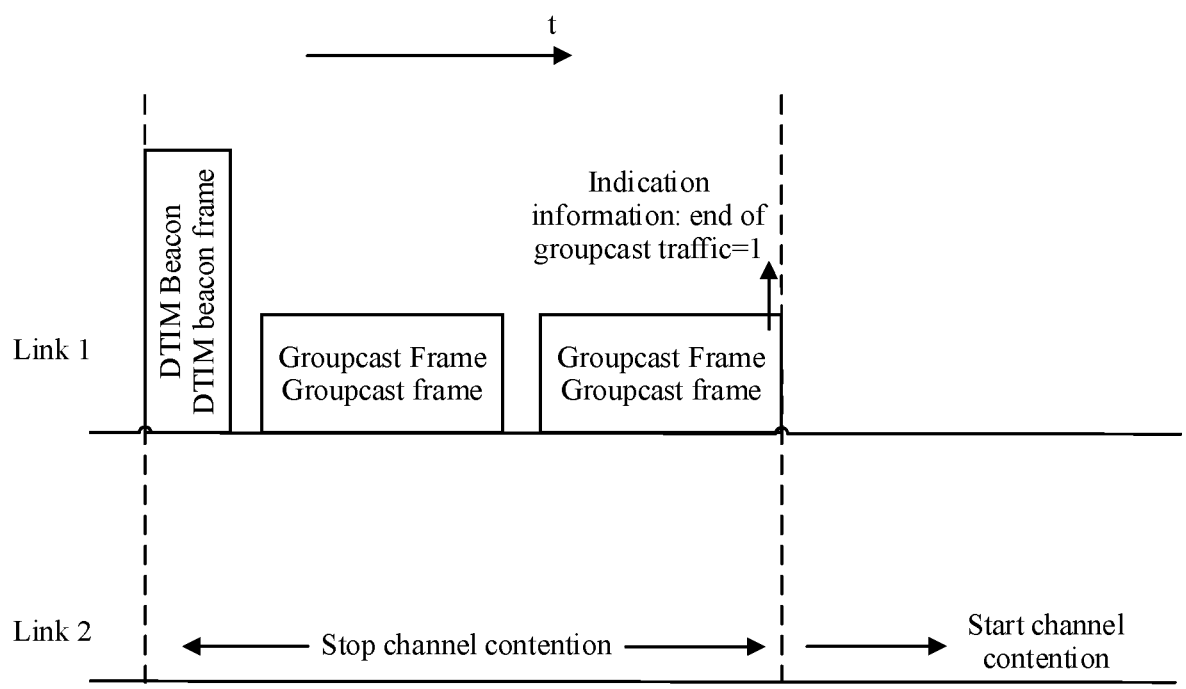
FIG. 2F is a schematic diagram of receiving a groupcast frame according to an embodiment of this application.

FIG. 2F is a schematic diagram of receiving a groupcast frame according to an embodiment of this application. As shown in FIG. 2F, a multi-link station device does not support simultaneous transmit and receive on a second link and a first link. On a time horizontal axis t, a first beacon frame sent on the first link by a first access point in a multi-link access point device may be a delivery traffic indication map (DTIM) beacon frame, where the DTIM beacon frame carries groupcast indication information, and the groupcast indication information is used to indicate a station that has to-be-received groupcast traffic. The multi-link station device receives the first beacon frame. If a first station in the multi-link station device is the station that has the to-be-received groupcast traffic, channel contention of a second station that is not capable of performing sending or receiving when the first station performs receiving or sending needs to be stopped.

In this case, how long does the channel contention of the second station that is not capable of performing sending or receiving when the first station performs receiving or sending need to be stopped? How to indicate duration for which the channel contention of the second station is stopped? The following method is provided.

Optionally, after the first access point in the multi-link access point device sends the DTIM beacon frame on the first link, the first access point sends the groupcast frame on the first link. The last groupcast frame sent by the first access point carries an end identifier, and the end identifier is used to indicate that sending of the groupcast traffic is completed. The channel contention of the second station that is not capable of performing sending or receiving when the first station performs receiving or sending is stopped when the first station receives the groupcast traffic, and is started after the last groupcast frame that carries the end identifier ends.

For example, when a value of the end identifier is 1, it indicates that the sending of the groupcast traffic is completed, and when the value of the end identifier is a default value or 0, it indicates that the sending of the groupcast traffic is not completed. Alternatively, when a value of the end identifier is 0, it indicates that the sending of the groupcast traffic is completed, and when the value of the end identifier is a default value or 1, it indicates that the sending of the groupcast traffic is not completed. Alternatively, when a value of the end identifier is a default value, it indicates that the sending of the groupcast traffic is completed, or the like. The end identifier may be carried in a more data field in a MAC header in the groupcast frame. For example, when a value of the more data field is 0, it indicates that the sending of the groupcast traffic is completed. Alternatively, the end identifier is carried in an end of service period field (EOSP). When a value of the EOSP field is 1, it indicates that the sending of the groupcast traffic is completed. Optionally, the last groupcast frame sent by the first access point may include the end identifier used to indicate that the sending is completed, and another groupcast frame does not include the end identifier. The second station determines, based on the end identifier, that the first station completes receiving of the groupcast traffic, and restarts the channel contention.

Optionally, the first beacon frame further carries groupcast traffic sending duration. The channel contention of the second station that is not capable of performing sending or receiving when the first station performs receiving or sending is stopped within the duration, and is started after the duration ends.

Optionally, the first beacon frame further carries a groupcast traffic end moment. The channel contention of the second station that is not capable of performing sending or receiving when the first station performs receiving or sending is stopped before the moment, and is started after the moment.

It can be learned that, in this embodiment of this application, the multi-link access point device does not support performing receiving on one of the first link and the second link while performing sending on the other of the first link and the second link. The first station on the first link is determined, based on the groupcast indication information, to be the station that has the to-be-received groupcast traffic. Therefore, the channel contention of the second station is stopped when the first station receives the groupcast traffic, and is started after the first station completes the receiving of the groupcast traffic, so that the receiving of the groupcast traffic by the first station on the first link is not affected.

In a possible case, the first beacon frame further includes broadcast indication information. Step 201 and step 203 may be replaced with: 201': A multi-link access point device generates a first beacon frame that carries groupcast indication information and broadcast indication information, where the groupcast indication information is used to indicate a station that has to-be-received groupcast traffic, and the broadcast indication information is used to indicate whether there is to-be-received broadcast traffic; and 203': A multi-link station device receives the first beacon frame, and if a first station in the multi-link station device is the station that has the to-be-received groupcast traffic and/or the to-be-received broadcast traffic, stops channel contention of a second station that is not capable of performing sending or receiving when the first station performs receiving or sending. That is, the multi-link station device receives the first beacon frame through the first link, and determines, based on the groupcast indication information and the broadcast indication information in the first beacon frame, whether the first station on the first link has the to-be-received broadcast traffic or the to-be-received groupcast traffic. If the first station has the to-be-received broadcast traffic or the to-be-received groupcast traffic, the channel contention of the second station that is not capable of performing sending or receiving when the first station performs receiving or sending is stopped. Optionally, after the channel contention of the second station is stopped, the groupcast traffic indication method in the multi-link device further includes the following steps.

204b: The first station in the multi-link station device receives the groupcast traffic or the broadcast traffic.

205b: After determining that the first station completes receiving of the groupcast traffic or the broadcast traffic, the multi-link station device restarts the channel contention of the second station.

In this embodiment of this application, if the first beacon frame includes both the broadcast indication information and the groupcast indication information, the first station has three traffic to-be-received statuses: only the groupcast traffic is to be received, only the broadcast traffic is to be received, or both the groupcast traffic and the broadcast traffic are to be received.

For a case in which only the groupcast traffic is to be received, description is provided in the embodiment of step 204a and step 205a, and details are not described herein again.

Figure 2G:
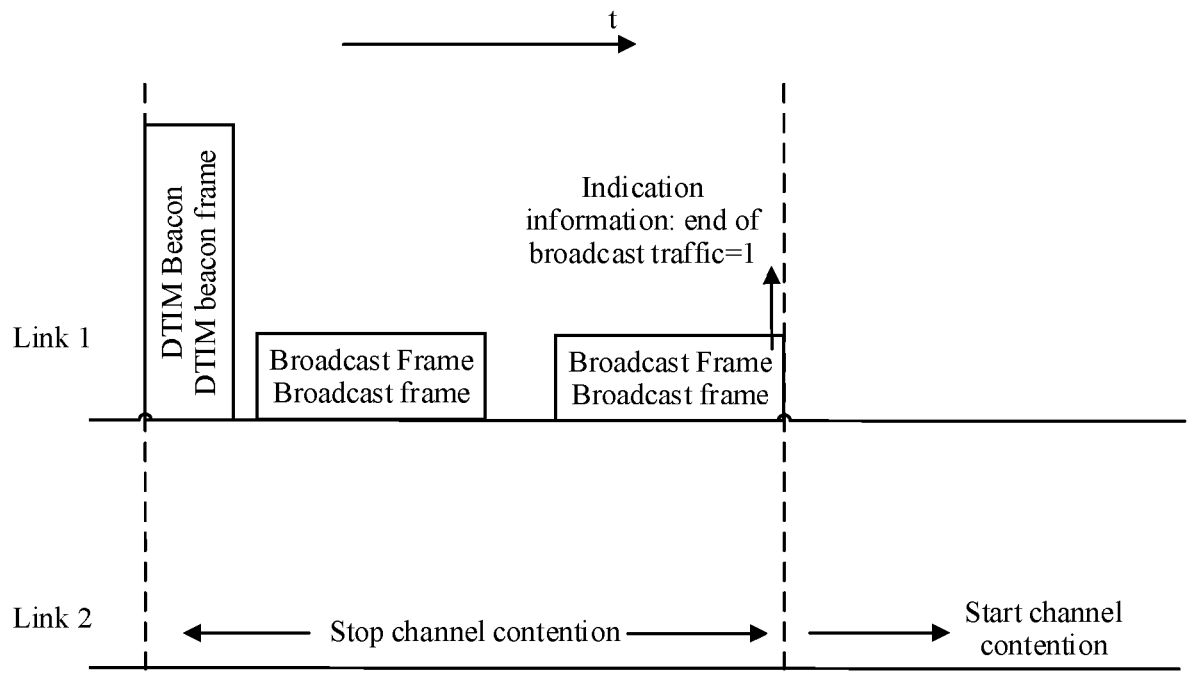
FIG. 2G is a schematic diagram of receiving a broadcast frame according to an embodiment of this application.

For a case in which the first station has only the to-be-received broadcast traffic, refer to FIG. 2G. FIG. 2G is a schematic diagram of receiving a broadcast frame according to an embodiment of this application. As shown in FIG. 2G, on a time axis t, a first beacon frame sent by a first access point in a multi-link access point device may be a DTIM beacon frame, where the DTIM beacon frame carries groupcast indication information and broadcast indication information. The groupcast indication information is used to indicate a station that has to-be-received groupcast traffic, and the broadcast indication information is used to indicate whether there is to-be-received broadcast traffic. A multi-link station device receives the first beacon frame, and if a first station in the multi-link station device is a station that has no to-be-received groupcast traffic, and the broadcast indication information indicates that there is the to-be-received broadcast traffic, stops channel contention of a second station that is not capable of performing sending or receiving when the first station performs receiving or sending.

In this case, how long does the channel contention of the second station that is not capable of performing sending or receiving when the first station performs receiving or sending need to be stopped? How to indicate duration for which the channel contention of the second station is stopped? The following method is provided.

Optionally, after the first access point in the multi-link access point device sends the DTIM beacon frame on the first link, the first access point sends the broadcast frame on the first link. The last broadcast frame sent by the first access point carries an end identifier, and the end identifier is used to indicate that sending of the broadcast traffic is completed. The channel contention of the second station that is not capable of performing sending or receiving when the first station performs receiving or sending is stopped when the first station receives the broadcast traffic, and is started after the last broadcast frame that carries the end identifier ends.

For example, when a value of the end identifier of the broadcast traffic is 1, it indicates that the sending of the broadcast traffic is completed, and when the value of the end identifier is a default value or 0, it indicates that the sending of the broadcast traffic is not completed. Alternatively, when a value of the end identifier is 0, it indicates that the sending of the broadcast traffic is completed, and when the value of the end identifier is a default value or 1, it indicates that the sending of the broadcast traffic is not completed. Alternatively, when a value of the end identifier is a default value, it indicates that the sending of the broadcast traffic is completed, or the like. The end identifier of the broadcast traffic may be carried in a more data field in a MAC header in the broadcast frame, or carried in an EOSP field. For example, when a value of the more data field is 0, it indicates that the sending of the broadcast traffic is completed. Alternatively, the end identifier is carried in an end of service period (EOSP) field. When a value of the EOSP field is 1, it indicates that the sending of the broadcast traffic is completed.

Optionally, the first beacon frame further carries broadcast traffic sending duration. The channel contention of the second station that is not capable of performing sending or receiving when the first station performs receiving or sending is stopped within the duration, and is started after the duration ends.

Optionally, the first beacon frame further carries a broadcast traffic end moment. The channel contention of the second station that is not capable of performing sending or receiving when the first station performs receiving or sending is stopped before the moment, and is started after the moment.

Optionally, the first beacon frame may further include broadcast traffic priority indication information, used to indicate a priority of the broadcast traffic. If the priority is low, when the first station receives the broadcast frame, the channel contention of the second station on the second link may alternatively not be stopped.

Figure 2H:
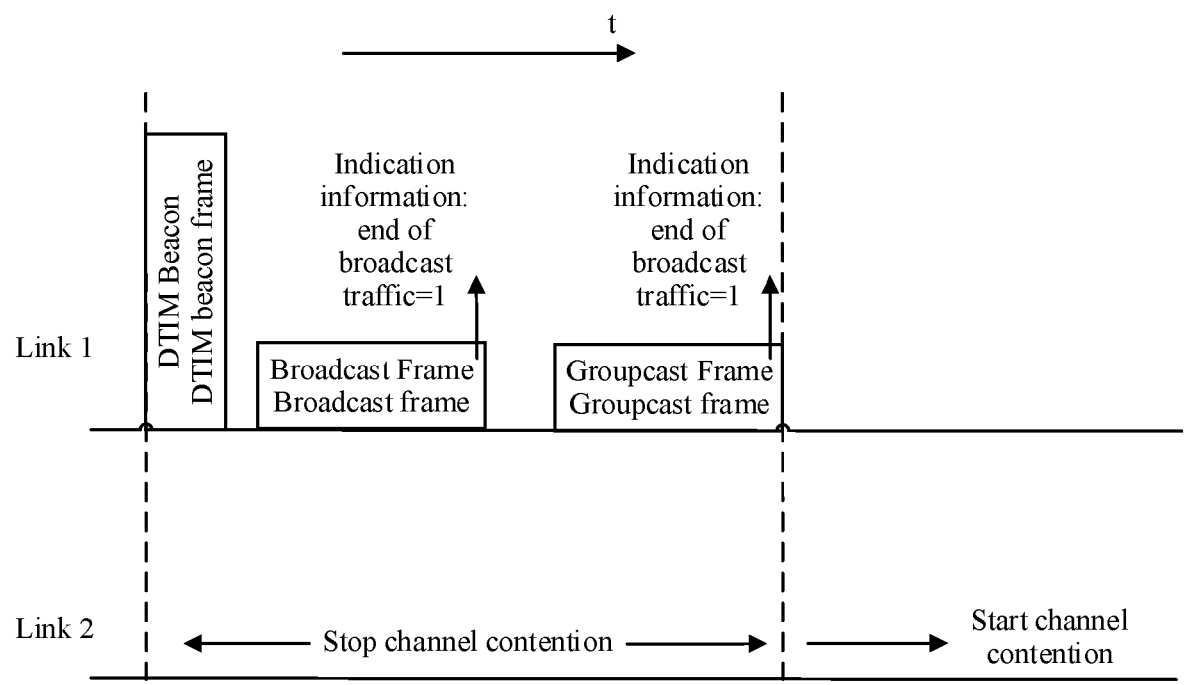
FIG. 2H is a schematic diagram of receiving a groupcast frame and a broadcast frame according to an embodiment of this application.

For a case in which the first station has both the to-be-received broadcast traffic and the to-be-received groupcast traffic, refer to FIG. 2H. FIG. 2H is a schematic diagram of receiving a groupcast frame and a broadcast frame according to an embodiment of this application. As shown in FIG. 2H, on a time axis t, a first beacon frame sent by a first access point in a multi-link access point device may be a DTIM beacon frame, where the DTIM beacon frame carries groupcast indication information and broadcast indication information. The groupcast indication information is used to indicate a station that has to-be-received groupcast traffic, and the broadcast indication information is used to indicate whether there is to-be-received broadcast traffic. A multi-link station device receives the first beacon frame, and if a first station in the multi-link station device is the station that has the to-be-received groupcast traffic, and the broadcast indication information indicates that there is the to-be-received broadcast traffic, stops channel contention of a second station that is not capable of performing sending or receiving when the first station performs receiving or sending.

In this case, how long does the channel contention of the second station that is not capable of performing sending or receiving when the first station performs receiving or sending need to be stopped? How to indicate duration for which the channel contention of the second station is stopped? The following method is provided.

Optionally, after the first access point in the multi-link access point device sends the DTIM beacon frame on the first link, the first access point sends the groupcast frame and the broadcast frame on the first link. Optionally, the groupcast frame and the broadcast frame may be sent based on a traffic generation sequence, or may be sent based on a traffic priority sequence. For example, if a priority of the groupcast traffic is higher than that of the broadcast traffic, the broadcast frame may be sent after the groupcast frame is sent. The last groupcast frame sent by the first access point carries an end identifier, and the end identifier is used to indicate that sending of the groupcast traffic is completed. The last broadcast frame sent by the first access point carries an end identifier, and the end identifier is used to indicate that sending of the broadcast traffic is completed. Alternatively, after a sending sequence of the broadcast traffic and the groupcast traffic is determined, the last traffic frame corresponding to traffic that is later sent carries an end identifier, used to indicate that both sending of the groupcast traffic and sending of the broadcast traffic are completed. The channel contention of the second station that is not capable of performing sending or receiving when the first station performs receiving or sending is stopped when the first station receives the groupcast traffic and the broadcast traffic, and is started after the last groupcast frame that carries the end identifier or the last broadcast frame that carries the end identifier ends.

Settings of the end identifier of the groupcast frame and the end identifier of the broadcast frame in this embodiment may correspond to a setting of the foregoing end identifier of the groupcast frame and a setting of the foregoing end identifier of the broadcast frame, and details are not described herein again.

Optionally, after the first access point generates the first beacon frame that includes a groupcast traffic indication (and a broadcast traffic indication), or after it is determined, based on a groupcast traffic indication (and a broadcast traffic indication) in the first beacon frame, that the first access point is to send the groupcast traffic (and/or the broadcast traffic) on the first link, a second access point may stop sending a first message to the second station on the second link. That a second access point may stop sending a first message to the second station on the second link includes that a first multi-link access point device performs uniform scheduling, to stop the second access point sending the first message, or that the first access point sends prompt information to the second access point, to prompt the second access point to stop sending the first message, where the prompt information may further prompt a corresponding time period in which the second access point stops sending the first message. The first message is a message that needs to be responded to or answered by the second station. The second access point stops sending the first message, so that the second station can be prevented from sending a response message for the first message, thereby avoiding interference, caused by sending the response message by the second station, to receiving data by the first station.

It can be learned that, in this embodiment of this application, the multi-link station device does not support simultaneous transmit and receive on the first link and the second link. The first station on the first link is determined, based on the groupcast indication information and the broadcast indication information, to be the station that has the to-be-received groupcast traffic and/or the to-be-received broadcast traffic. Therefore, the channel contention of the second station is stopped when the first station receives the broadcast traffic and/or the groupcast traffic, and is started after the first station completes receiving of the groupcast traffic and/or the broadcast traffic, so that the receiving of the groupcast traffic and the broadcast traffic by the first station on the first link is not affected.

Figure 3A:
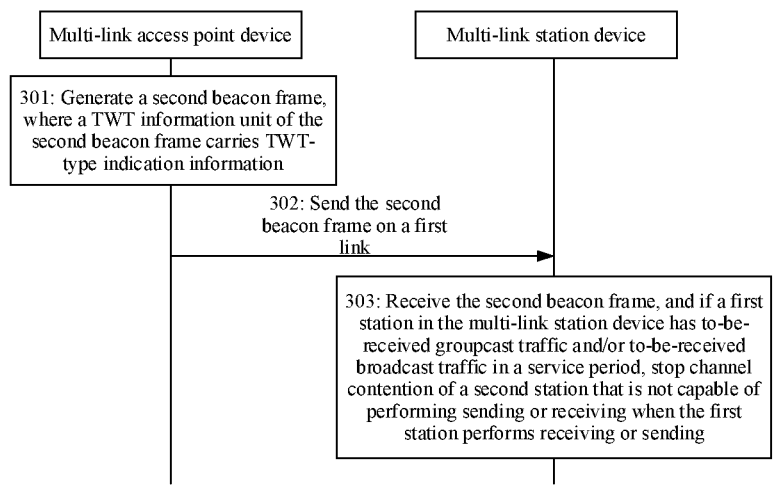
FIG. 3A is a flowchart of a communication method according to an embodiment of this application.

In some cases, for an NSTR MLD, if it is possible to receive broadcast traffic or groupcast traffic in an entire process in which the NSTR MLD communicates with another device, and the NSTR MLD performs channel interference avoidance between nonsimultaneous transmit and receive links when receiving the broadcast traffic or the groupcast traffic, communication efficiency may be affected. Based on this, FIG. 3A shows a communication method according to an embodiment of this application. As shown in FIG. 3A, the method includes the following steps.

301: A multi-link access point device generates a second beacon frame, where a target wake time (TWT) information unit of the second beacon frame carries TWT-type indication information, and the TWT-type indication information is used to indicate whether a service period specified by the TWT information unit is used to transmit groupcast traffic and/or broadcast traffic.

In 301, for the service period specified by the TWT information unit, details are as follows: start time of the TWT service period is indicated by a Target Wake Time field in the TWT information unit, and duration of the TWT service period is indicated by a Nominal Minimum TWT Wake Duration field.

302: The multi-link access point device sends the second beacon frame on a first link.

303: A multi-link station device receives the second beacon frame, and if a first station in the multi-link station device has the to-be-received groupcast traffic and/or the to-be-received broadcast traffic in the service period, stops channel contention of a second station that is not capable of performing sending or receiving when the first station performs receiving or sending.

Similarly, in this embodiment of this application, the first station and the second station are stations in the multi-link station device, a first access point and a second access point are access points in the multi-link access point device, the first access point communicates with the first station on the first link (a link 1), and the second access point communicates with the second station on a second link (a link 2). The multi-link station device is an NSTR MLD. In addition, when the first station performs receiving on the link 1, the second station cannot perform sending on the link 2, or when the first station performs sending on the link 1, the second station cannot perform receiving on the link 2.

Target wake time (TWT) is used to indicate to start or activate at least one activity or traffic in the corresponding service period. In this embodiment of this application, the TWT information unit generated by the multi-link access point device includes the TWT-type indication information, used to indicate whether the service period (or a time range) indicated by the TWT information unit is used to process the groupcast traffic and/or the broadcast traffic, that is, used to process one of the groupcast traffic or the broadcast traffic, or used to process both the groupcast traffic and the broadcast traffic.

The TWT information unit may be sent through broadcast. In this case, broadcast TWT is established. Alternatively, the TWT information unit may be sent through unicast. In this case, unicast TWT is established. The broadcast TWT is for all multi-link station devices that can communicate with the multi-link access point device. For example, in FIG. 1C, the multi-link access point device 101 may send broadcast TWT to the multi-link station devices 102, 103, 104, and the like. Because communication between the multi-link devices corresponds to multi-link communication between modules in the devices, that the multi-link access point device 101 may send broadcast TWT to the multi-link station devices 102, 103, 104, and the like corresponds to that the AP 1 in the multi-link access point device 101 sends the broadcast TWT to the STA 11 in the multi-link station device 102, the STA 21 in the multi-link station device 103, and the STA 31 in the multi-link station device 104. The TWT elements indicate a same time range, and indicate same traffic to be received by the stations. The unicast TWT is for a multi-link station device that can communicate with the multi-link access point device. For example, in FIG. 1C, the multi-link access point device 101 may send unicast TWT to the multi-link station device 102, and send unicast TWT to the multi-link station device 103. That is, the AP 1 may send the unicast TWT to the STA 11, and send the unicast TWT to the STA 21. Different unicast TWT may indicate a same time range or different time ranges, and may indicate same groupcast traffic or different groupcast traffic to be received by the stations. That is, if the STA 11 and the STA 21 correspond to same groupcast traffic, to-be-received groupcast traffic indicated by the unicast TWT sent to the STA 11 and to-be-received groupcast traffic indicated by the unicast TWT sent to the STA 21 are the same. If the STA 11 and the STA 21 correspond to different groupcast traffic, to-be-received groupcast traffic indicated by the unicast TWT sent to the STA 11 and to-be-received groupcast traffic indicated by the unicast TWT sent to the STA 21 are different. In addition, each TWT information unit may include an identifier or a number, used to determine a station to which the TWT information unit corresponds.

Figure 3B:
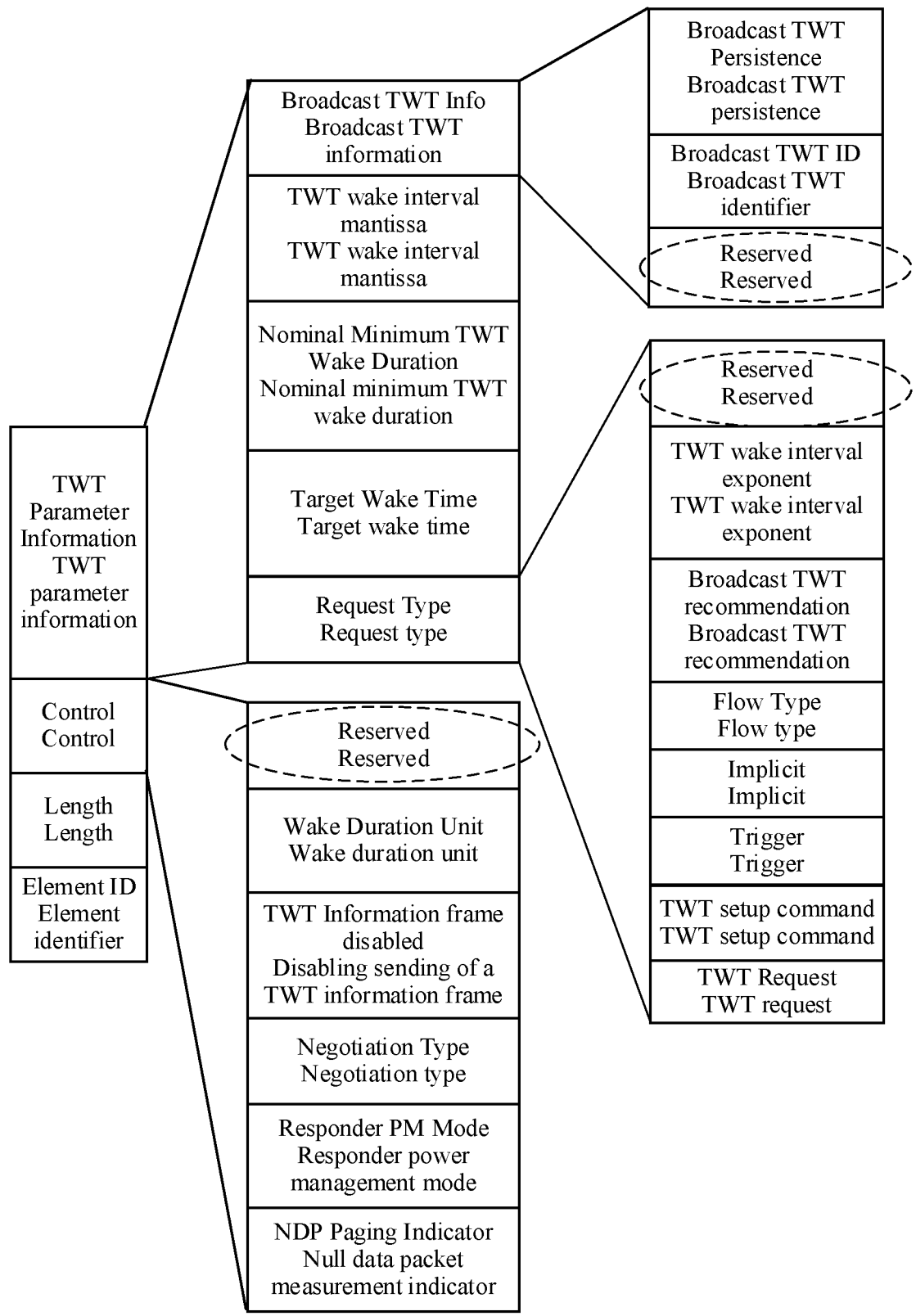
FIG. 3B is a schematic diagram of a frame structure of a broadcast TWT element according to an embodiment of this application.

Optionally, FIG. 3B is a schematic diagram of a frame structure of a broadcast TWT element according to an embodiment of this application. As shown in FIG. 3B, the broadcast TWT element includes three reserved fields. If information indicating whether a service period specified by a TWT information unit is used to send broadcast traffic and/or groupcast traffic is a plurality of pieces of information, one of the three fields is used to carry the plurality of pieces of information. Alternatively, the three fields may be separately used to carry a part of indication information in TWT-type indication information. For example, one of the reserved fields is used to carry information indicating whether the service period specified by the TWT information unit is used to send the broadcast traffic, and another reserved field is used to carry information indicating whether the service period specified by the TWT information unit is used to send the groupcast traffic. If the information indicating whether the service period specified by the TWT information unit is used to send the broadcast traffic and/or the groupcast traffic is one piece of information, one of the three reserved fields may be used to carry the information. The TWT-type indication information may alternatively be located in a broadcast TWT recommendation field (Broadcast TWT recommendation). That is, a reserved value of the broadcast TWT recommendation field is used to indicate whether the service period specified by the TWT information unit is used to transmit the groupcast traffic and/or the broadcast traffic.

Figure 3C:
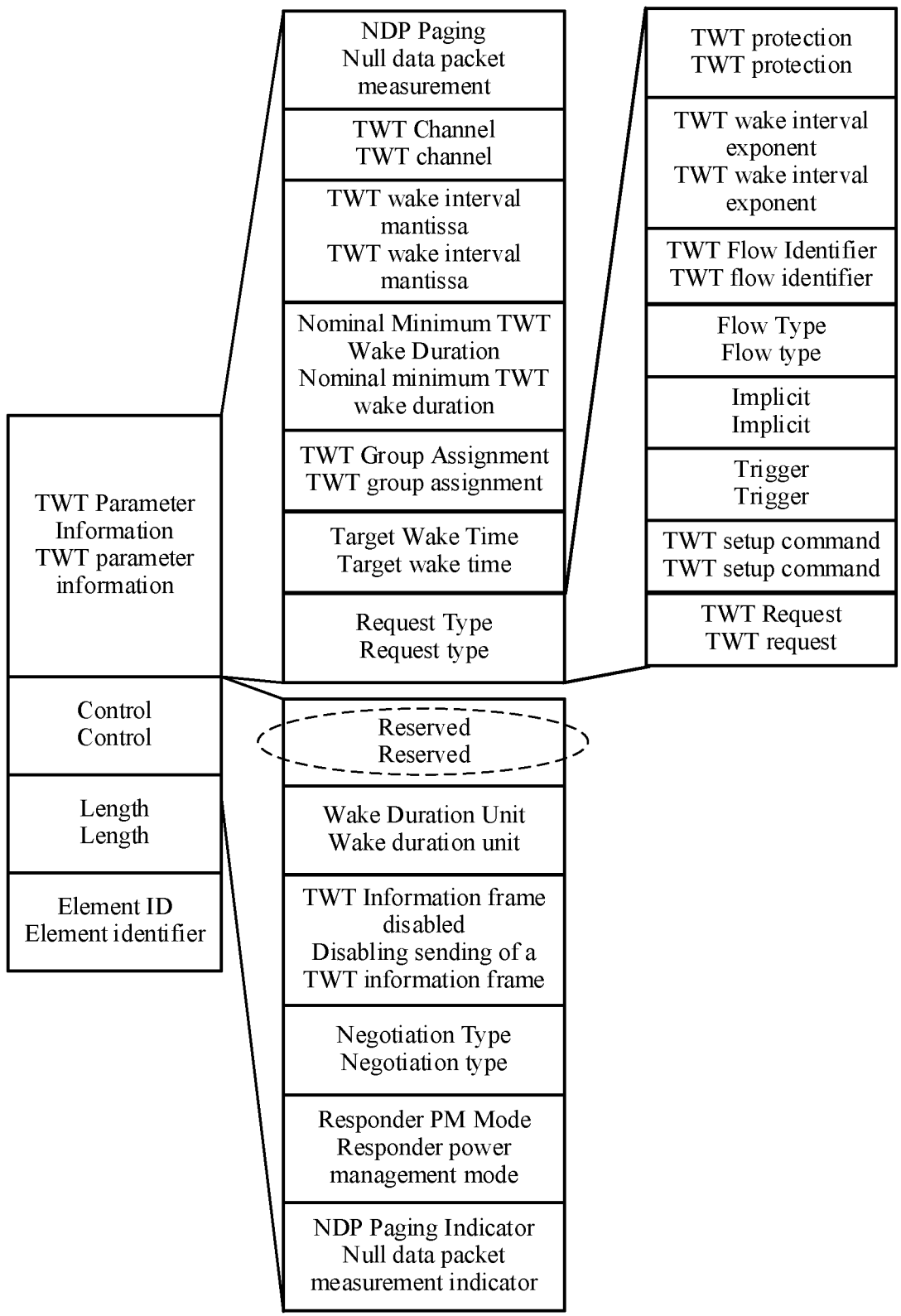
FIG. 3C is a schematic diagram of a frame structure of a unicast TWT element according to an embodiment of this application.

In addition, FIG. 3C is a schematic diagram of a frame structure of a unicast TWT element according to an embodiment of this application. As shown in FIG. 3C, the TWT element includes a reserved field that can be used to carry TWT-type indication information. Alternatively, the TWT-type indication information may be located in a TWT flow identifier field (TWT Flow identifier). That is, a reserved value of the TWT flow identifier field is used to indicate whether a service period specified by a TWT information unit is used to transmit groupcast traffic and/or broadcast traffic.

Regardless of the broadcast TWT or the unicast TWT, the start time of the TWT service period is indicated by the target wake time field (Target Wake Time) in the TWT information unit, and the duration of the TWT service period is indicated by the nominal minimum TWT wake duration field (Nominal Minimum TWT Wake Duration).

Optionally, the multi-link access point device may send, through a specific link, the second beacon frame that carries the TWT information unit, to determine whether the service period indicated by the TWT information unit is used to transmit the groupcast traffic and/or the broadcast traffic on the link. For example, the multi-link access point device sends the second beacon frame on the first link by using the first access point, and after the first station receives the second beacon frame on the first link, the first station determines, based on the TWT information unit carried in the second beacon frame, that duration in which the first station may receive the groupcast traffic and/or the broadcast traffic is the time range specified by the TWT information unit. Optionally, the multi-link access point device may carry a link identifier in the second beacon frame or the TWT information unit, to indicate that the service period indicated by the TWT information unit is used to transmit the groupcast traffic and/or the broadcast traffic on a link corresponding to the link identifier. For example, if the TWT information unit sent by the multi-link access point device on the second link carries a link identifier of the first link, the service period indicated by the TWT information unit is used to transmit the groupcast traffic and/or the broadcast traffic on the first link.

After determining that the first station transmits the groupcast traffic and/or the broadcast traffic in the time range specified by the TWT information unit, the multi-link station device may stop channel contention of the second station from the start time of the time range specified by the TWT information unit. After determining that the first station has no to-be-received broadcast traffic and/or groupcast traffic on a third link, or determining that sending of the broadcast traffic and/or the groupcast traffic is completed, the multi-link station device restarts the channel contention.

Figure 3D:
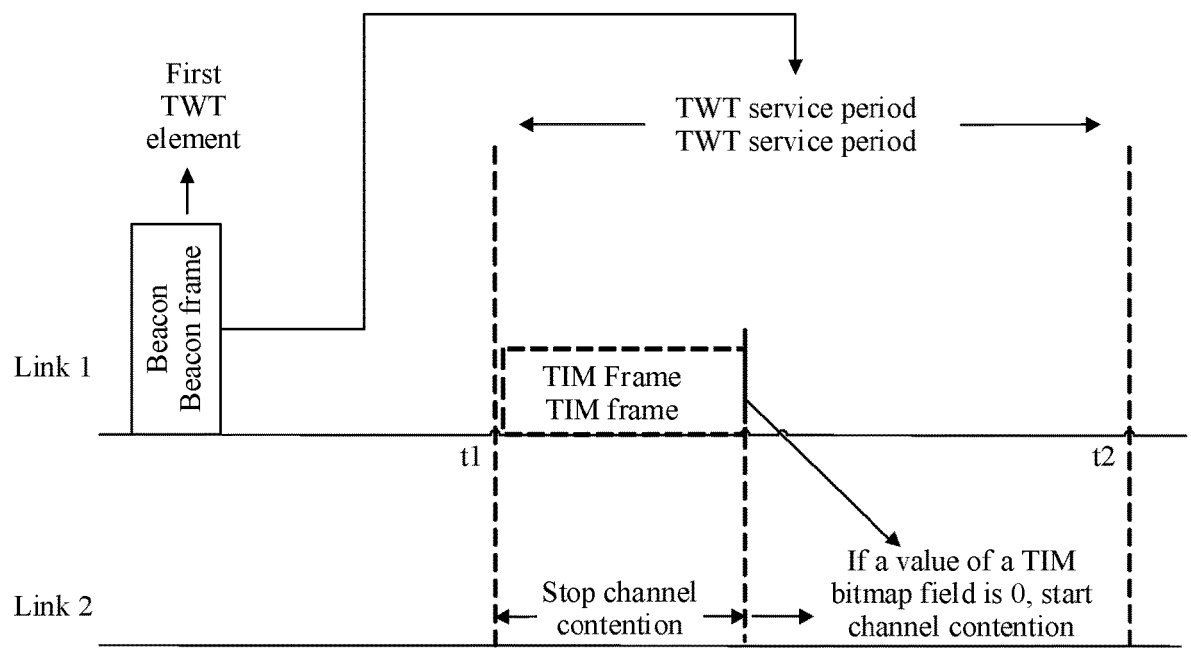
FIG. 3D is a schematic diagram of performing communication based on a TWT information unit according to an embodiment of this application.

Specifically, FIG. 3D is a schematic diagram of performing communication based on a TWT information unit according to an embodiment of this application. As shown in FIG. 3D, a first access point in a multi-link access point device sends a second beacon frame to a first station in a multi-link station device through a first link (a link 1). The second beacon frame includes a TWT information unit, used to determine a TWT service period, and a time range corresponding to the TWT service period is from t1 to t2. The first station may receive groupcast traffic and/or broadcast traffic within t1 to t2. Channel contention of a second station is stopped in the TWT service period when the first station receives the groupcast traffic and/or the broadcast traffic.

Figure 3E:
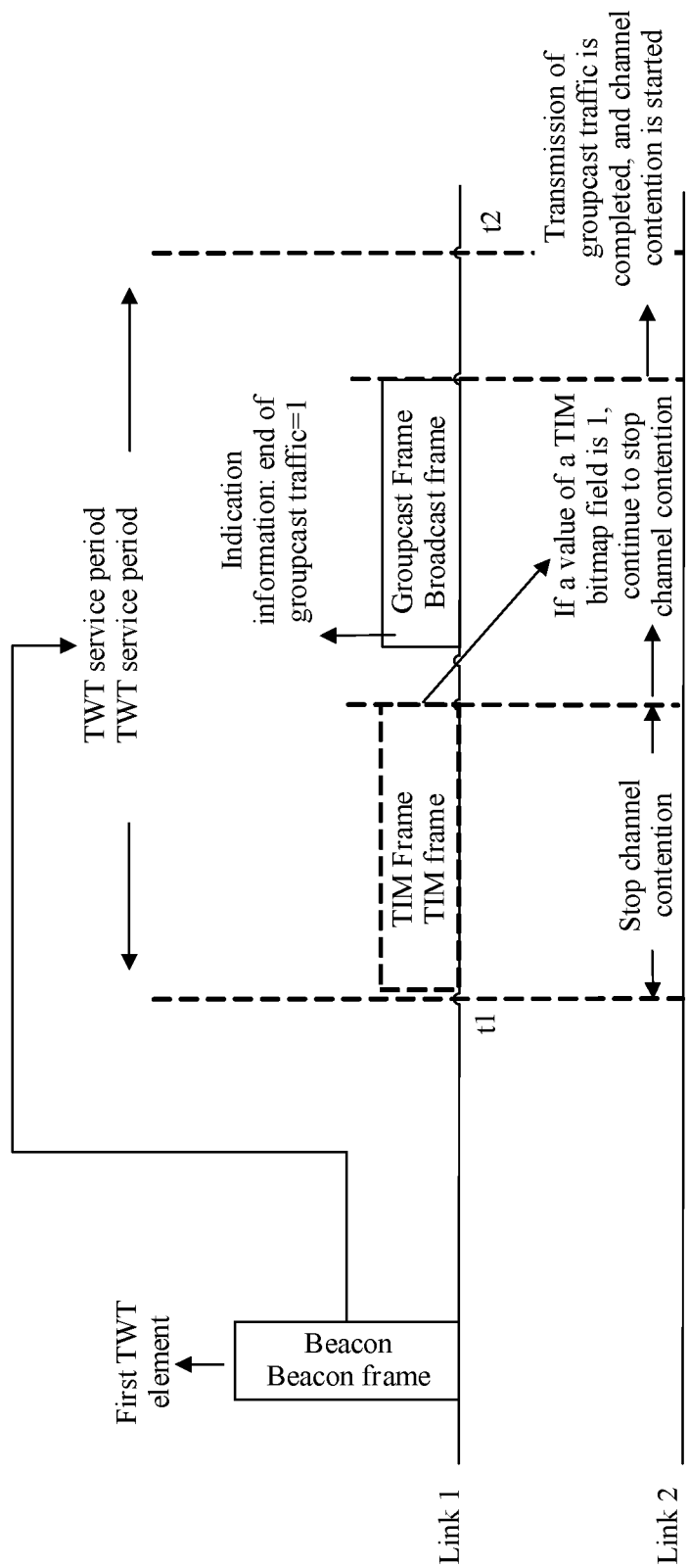
FIG. 3E is another schematic diagram of performing communication based on a TWT information unit according to an embodiment of this application.

Optionally, the first access point in the multi-link access point device may send a TIM frame in the TWT service period, where the TIM frame may indicate whether there is the groupcast traffic and/or the broadcast traffic on the first link. As shown in FIG. 3D, if the TIM frame indicates that there is no groupcast traffic and/or broadcast traffic, the channel contention of the second station is started after the TIM frame ends. Optionally, a TIM bitmap in the TIM frame may be used to indicate whether there is the groupcast traffic and/or the broadcast traffic. For example, when a value of the TIM bitmap field is 0, it indicates that there is no groupcast traffic and/or broadcast traffic, and when the value of the TIM bitmap field is 1, it indicates that there is the groupcast traffic and/or the broadcast traffic. For another example, as shown in FIG. 3E, if that the value of the TIM bitmap field is 1 indicates that there is the groupcast traffic and/or the broadcast traffic, and after sending the TIM frame, the first access point in the multi-link access point device continues to send a groupcast frame/a broadcast frame, the channel contention of the second station in the multi-link station device needs to be stopped during sending of the groupcast frame/the broadcast frame, and is started after the groupcast frame/the broadcast frame ends. That the channel contention is stopped and started is described in detail in the foregoing embodiment, and details are not described herein again.

Alternatively, the second beacon frame includes an element indicating whether there is the to-be-sent groupcast frame and/or the to-be-sent broadcast frame and time (in the TWT service period) at which the broadcast frame and/or the groupcast frame start/starts to be sent. The channel contention of the second station on a second link (a link 2) is stopped based on the time.

Figure 3F:
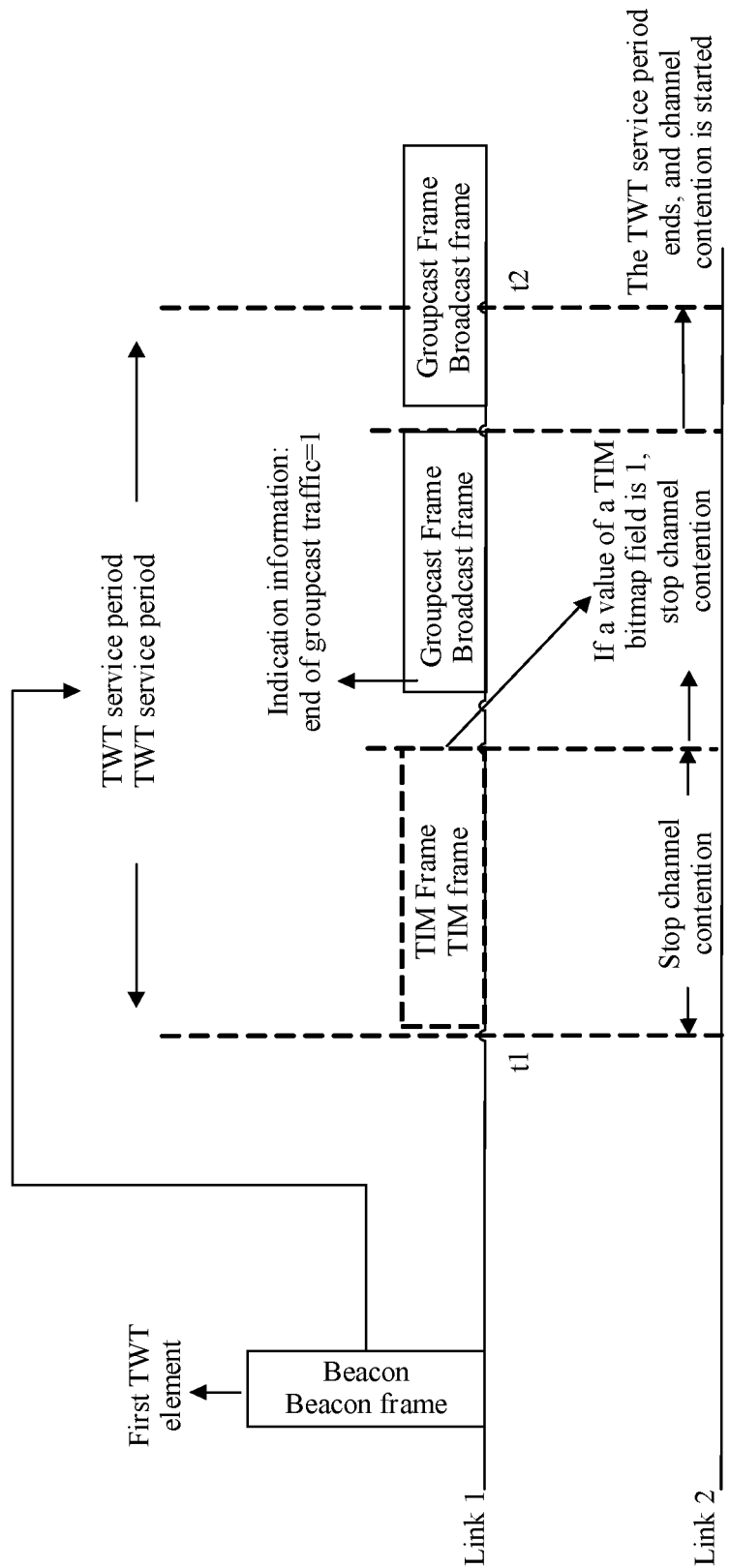
FIG. 3F is another schematic diagram of performing communication based on a TWT information unit according to an embodiment of this application.

In a possible case, FIG. 3F is another schematic diagram of performing communication based on a TWT information unit according to an embodiment of this application. As shown in FIG. 3F, when a time range indicated by a TWT information unit ends, that is, at time t2, if a first station in a multi-link station device still does not determine that there is no groupcast traffic and/or broadcast traffic, the multi-link station device may alternatively restart channel contention of a second station.

In this embodiment of this application, the multi-link access point device sends the TWT information unit on the first link, to indicate the time range in which the first station receives the groupcast traffic and/or the broadcast traffic, so that the first station processes the groupcast traffic and/or the broadcast traffic within the specified time range, without frequently processing the groupcast traffic and/or the broadcast traffic within other duration, thereby effectively controlling a frequency at which the channel contention of the second station that is not capable of performing sending or receiving when the first station performs receiving or sending is stopped, and improving communication efficiency.

Figure 3G:
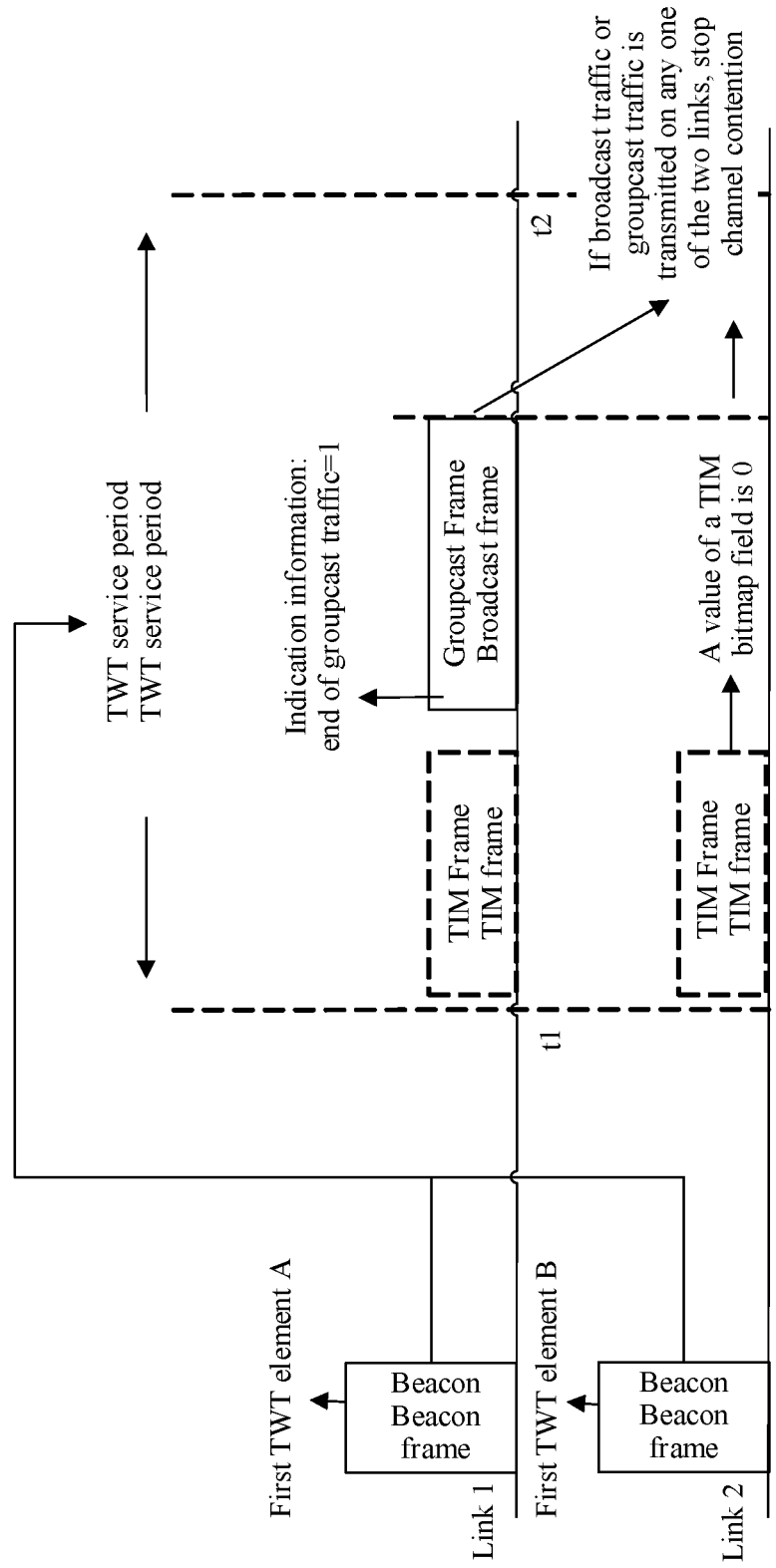
FIG. 3G is another schematic diagram of performing communication based on a TWT information unit according to an embodiment of this application.

In the foregoing description, the multi-link access point device sends the TWT information unit on the first link, to specify the service period corresponding to the groupcast traffic and/or the broadcast traffic of the first station. Optionally, the TWT information unit may alternatively be used to determine a service period corresponding to groupcast traffic and/or broadcast traffic of the second station. FIG. 3G is another schematic diagram of performing communication based on a TWT information unit according to an embodiment of this application. As shown in FIG. 3G, a first access point in a multi-link access point device sends a TWT information unit A to a first station through a first link, and a second access point sends a TWT information unit B to a second station through a second link. A TWT service period indicated by the TWT information unit A and a TWT service period indicated by the TWT information unit B may partially overlap or be the same. The first access point and the second access point send groupcast traffic and/or broadcast traffic in time ranges that partially overlap or that are the same. Alternatively, the TWT information unit corresponding to the second station may be sent by the first access point. For example, the TWT information unit sent by the first access point to the first station through the first link carries an identifier of the second link (and an identifier of the first link). In this case, the TWT information unit may alternatively be used to determine the time range in which the second station receives the groupcast traffic and/or the broadcast traffic on the second link. In this case, channel contention of the second station starts to be stopped at time t1 at which the second access point or the first access point sends a TIM frame, where the TIM frame may indicate whether there is the groupcast traffic and/or the broadcast traffic on the first link. If the TIM frame indicates that there is no groupcast traffic and/or broadcast traffic, after the TIM frame ends, the channel contention of the second station is started. If the TIM frame indicates that there is the groupcast traffic and/or the broadcast traffic, and the first access point in the multi-link access point device continues to send a groupcast frame/a broadcast frame after sending the TIM frame, the channel contention of the second station in the multi-link station device needs to be stopped during sending of the groupcast frame/the broadcast frame, and is started after the groupcast frame/the broadcast frame ends.

In this embodiment of this application, both two nonsimultaneous transmit and receive stations, namely, the first station and the second station, in the multi-link station device determines, by using the TWT information unit, the time range for receiving the groupcast traffic and/or the broadcast traffic, and the two time ranges may overlap or be the same. As a result, a channel access latency caused because the time at which the first station receives the groupcast traffic and/or the broadcast traffic and the time at which the second station receives the groupcast traffic and/or the broadcast traffic are asynchronous is reduced, thereby improving channel communication efficiency.

Optionally, this embodiment of this application may be independently performed, or may be combined with the embodiments corresponding to FIG. 2A to FIG. 2H. To be specific, before sending the groupcast frame and/or the broadcast frame, the first access point in the multi-link access point device sends the first beacon frame, where the first beacon frame includes the indication of groupcast traffic, used to indicate the station that has the to-be-received groupcast traffic, or used to indicate whether the station has the to-be-received broadcast service. Each of the two pieces of traffic corresponds to separate indication information, to prevent the first station from being unable to distinguish between the to-be-received broadcast traffic and the to-be-received groupcast traffic, and avoid a problem that whether the first station needs to receive the groupcast traffic cannot be learned. The first beacon frame may be separately sent, that is, the first beacon frame may further be included after the second beacon frame in FIG. 3D to FIG. 3G. Alternatively, the first beacon frame and the second beacon frame are a same beacon frame. That is, the beacon frame in FIG. 3D to FIG. 3G is a beacon frame obtained after the first beacon frame is combined with the second beacon frame. The beacon frame includes both the groupcast traffic indication (and the broadcast traffic indication) and the TWT information unit.

In this embodiment of this application, the TWT information unit and the groupcast traffic indication (and the broadcast traffic indication) are simultaneously sent, so that the first station in the multi-link station device can learn of whether to receive the groupcast traffic or the broadcast traffic in the time range indicated by the TWT information unit. Further, whether the channel contention of the second station needs to be stopped is determined. In this process, a channel access latency that may be caused by stopping the unnecessary channel contention is reduced, channel access control accuracy is improved, a channel access control frequency is reduced, and channel access control efficiency is improved.

Figure 4A:
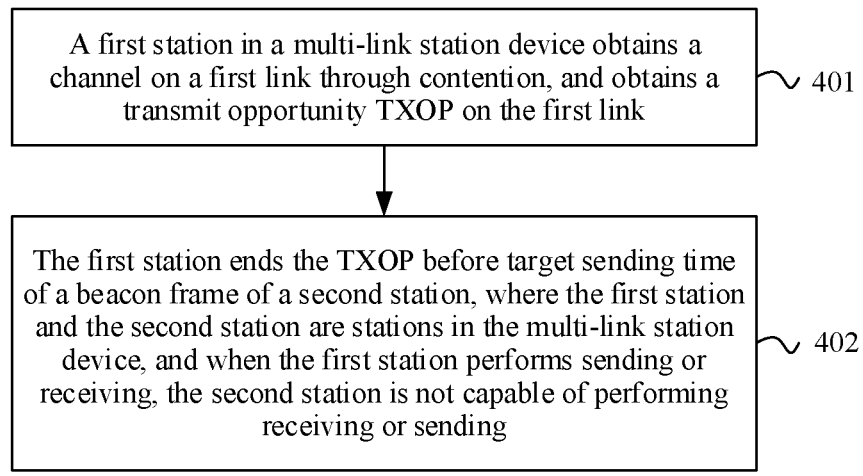
FIG. 4A is another flowchart of a communication method according to an embodiment of this application.

In some possible cases, in two NSTR links of a multi-link device, a reception point on one of the links has accessed a channel through contention, and a reception point on the other link needs to receive traffic. Considering that sending of information on the link that has accessed the channel may cause interference to the link that receives the traffic, FIG. 4A shows a communication method according to an embodiment of this application. As shown in FIG. 4A, to resolve this problem, the method includes the following steps.

401: A first station in a multi-link station device obtains a channel on a first link through contention, and obtains a transmit opportunity TXOP on the first link.

402: The first station ends the TXOP before target sending time of a beacon frame of a second station, where the first station and the second station are stations in the multi-link station device, and when the first station performs sending or receiving, the second station is not capable of performing receiving or sending.

Figure 4B:
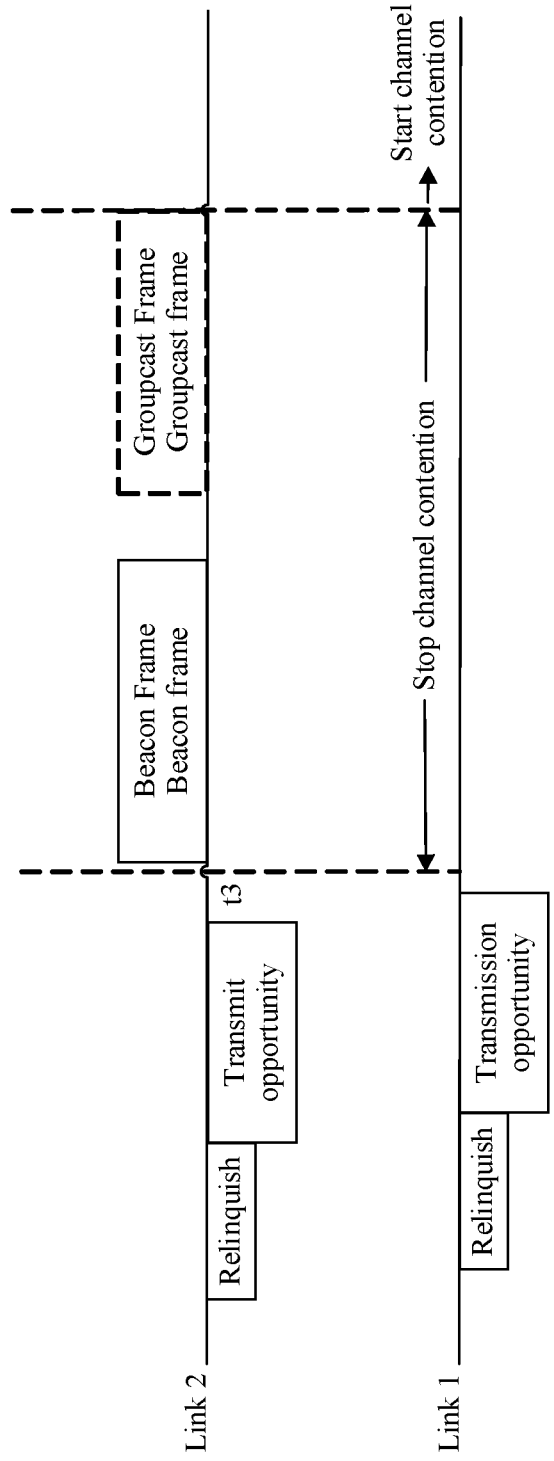
FIG. 4B is a schematic diagram of a communication process according to an embodiment of this application.

Specifically, FIG. 4B is a schematic diagram of a communication process according to an embodiment of this application. As shown in FIG. 4B, before time t3, both a station corresponding to a first link (a link 1) and a station corresponding to a second link (a link 2) can perform channel contention, obtain a transmit opportunity (TXOP), and send a data frame within duration corresponding to the TXOP. After the TXOP ends, receiving of another beacon frame may continue, or time of ending the TXOP is determined based on time of receiving another beacon frame. For example, the multi-link station device learns that the target sending time corresponding to the beacon frame of the second station is the time t3, and therefore ends the TXOP of the second station before the time t3, to receive the beacon frame on the second link. In this case, because the first station and the second station are the stations in the multi-link station device, and when the first station performs sending or receiving, the second station is not capable of performing receiving or sending, when the second station has a to-be sent beacon frame at the time t3, if the first station has obtained the TXOP, the first station needs to end the TXOP before the time t3, to avoid interference, caused by sending data by the first station in the TXOP, to receiving the beacon frame by the second station. If the first station performs channel contention before the time t3, similarly, the first station needs to end the channel contention before the time t3.

It can be learned that, in this embodiment of this application, the multi-link station device determines the target sending time of the beacon frame on the second link, so that after the first station obtains the TXOP, the first station determines, based on the target sending time of the beacon frame on the second link, the time of ending the TXOP of the first station or ending the channel contention. As a result, channel access control accuracy is improved, and channel interference between the NSTR links in the multi-link station device is avoided.

Figure 4C:
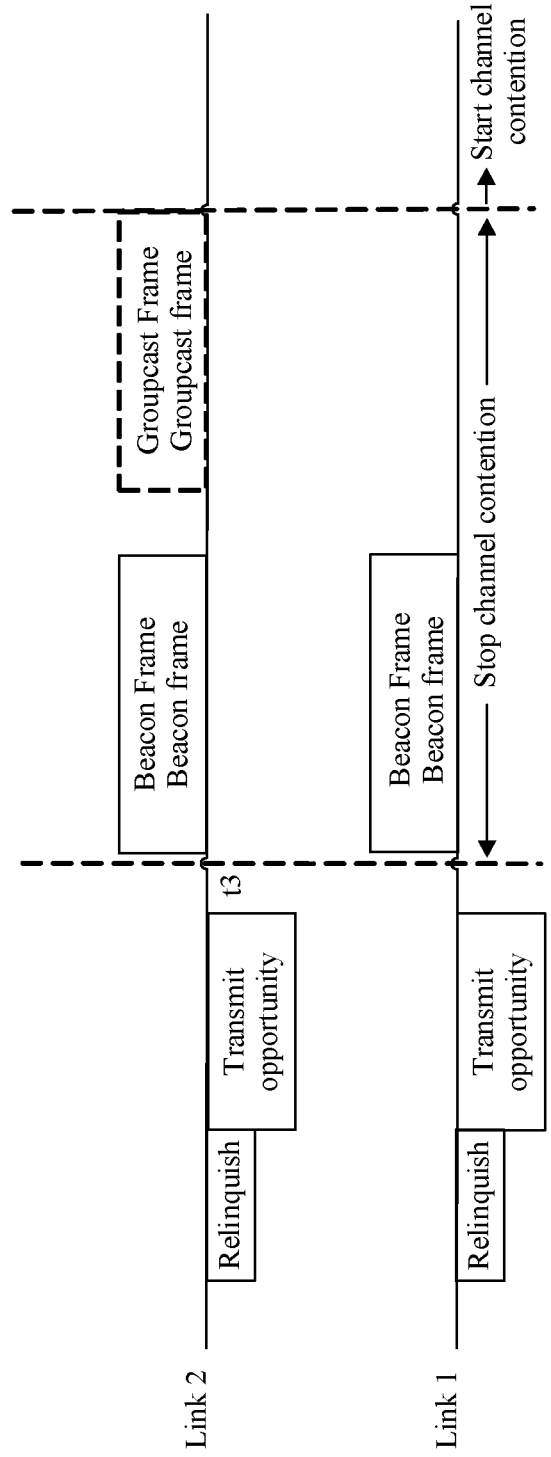
FIG. 4C is another schematic diagram of a communication process according to an embodiment of this application.

In an optional case, a multi-link access point device may determine target sending time of a fourth beacon frame of a first access point based on target sending time of a third beacon frame of a second access point. For example, it is determined that the target sending time of the fourth beacon frame is the same as the target sending time of the third beacon frame. In this way, the first station may determine time of ending the channel contention by using the time of sending the fourth beacon frame, and simultaneously ensure that no interference is caused to receiving of a data frame on the other link. Specifically, FIG. 4C is another schematic diagram of a communication process according to an embodiment of this application. As shown in FIG. 4C, a multi-link access point device learns that target sending time of a third beacon frame of a second access point is time t3, and determines that target sending time of a fourth beacon frame of a first access point is also the time t3. Therefore, both the second station and the first station end the transmit opportunity or the channel contention before the time t3. At the time t3, the corresponding beacon frames are separately sent on the two links. Optionally, the third beacon frame or the fourth beacon frame is a DTIM beacon frame, where the DTIM frame may indicate whether there is groupcast traffic and/or broadcast traffic on the first link. If the DTIM frame indicates that there is no groupcast traffic and/or broadcast traffic, after the DTIM frame ends, the channel contention of the second station is started. If the DTIM frame indicates that there is the groupcast traffic and/or the broadcast traffic, and the first access point in the multi-link access point device continues to send a groupcast frame/a broadcast frame after sending the DTIM frame, the channel contention of the second station in the multi-link station device needs to be stopped during sending of the groupcast frame/the broadcast frame, and is started after the groupcast frame/the broadcast frame ends. The DTIM frame may also indicate whether there is the groupcast traffic and/or the broadcast traffic on the second link, and the channel contention of the first station may be started or stopped based on content indicated by the DTIM frame.

It can be learned that, in this embodiment of this application, the multi-link access point device determines the target sending time of the beacon frame of the second link based on the target sending time of the beacon frame of the first link, so that the multi-link station device can determine, based on the same target sending time, to end the transmit opportunity of the first station and the transmit opportunity of the second station. Therefore, a problem that the nonsimultaneous transmit and receive links of the multi-link station device may cause channel interference can be resolved in advance, thereby improving channel access control efficiency.

Figure 4D:
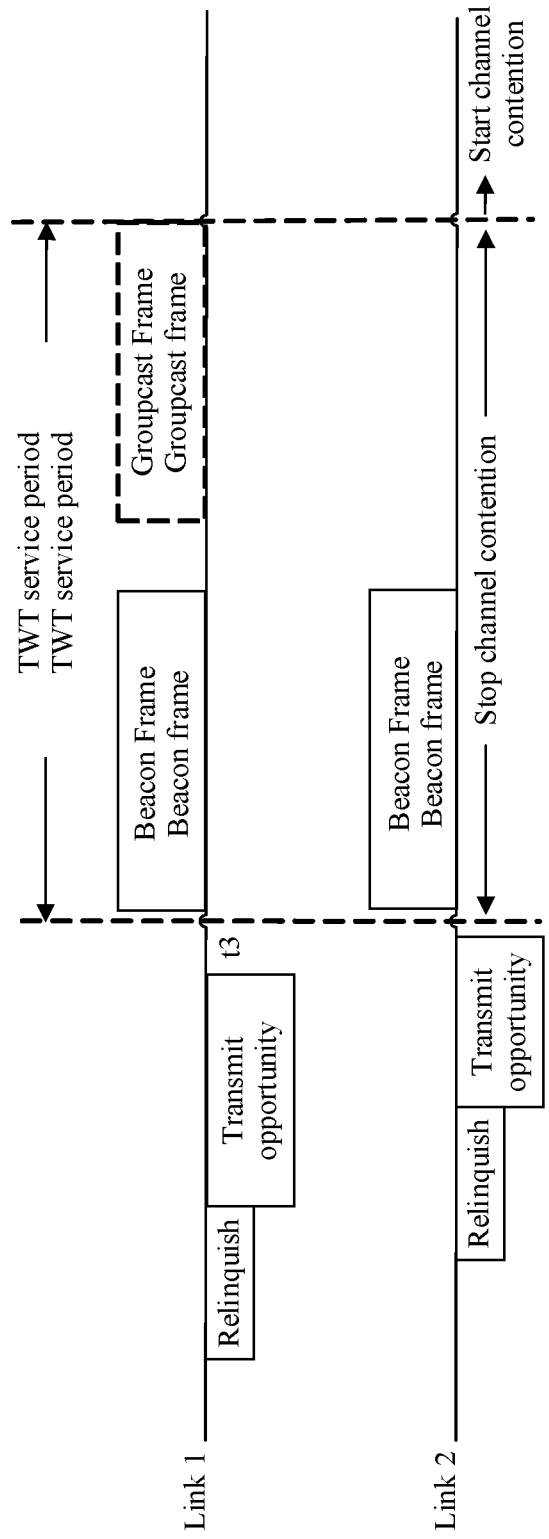
FIG. 4D is another schematic diagram of a communication process according to an embodiment of this application.

Optionally, this embodiment of this application may be combined with the embodiments corresponding to FIG. 3A to FIG. 3G. To be specific, before the beacon frame is sent on the link 1 or the link 2 in FIG. 4B or FIG. 4C, the TWT service period may be determined by using the TWT information unit. Specifically, as shown in FIG. 4D, the time at which the beacon frame is sent on the link 1 and the link 2 is determined, and the time is in the time range corresponding to the TWT service period. In this case, in the multi-link access point device, the second access point or the first access point that sends information on the link 2 or the link 1 may determine, by using sending time of the beacon frame in the TWT service period or start time of the TWT service period, the time of ending the transmit opportunity or stopping the channel contention. In this way, a time range for sending the beacon frame (and the traffic frame indicated by the beacon frame) may be explicitly limited, thereby reducing a channel access latency, and improving channel access efficiency.

Optionally, this embodiment of this application may be combined with the embodiments corresponding to FIG. 2A to FIG. 2H. That is, the groupcast indication information (and the broadcast indication information) is sent by using the first beacon frame. That is, in FIG. 4B or FIG. 4C, the beacon frame sent by the second access point in the multi-link access point device may include the groupcast traffic indication (and the broadcast traffic indication). In this way, the multi-link station device can more accurately determine, based on the to-be-received status of the groupcast traffic or the broadcast traffic, whether to end channel transmission of the station. For example, only when the second station on the second link (the link 2) has the to-be-received groupcast traffic, the first access point on the first link (the link 1) ends the transmit opportunity. Alternatively, only when there is to-be-received broadcast traffic whose importance is greater than a preset threshold on the second link, the first access point ends the transmit opportunity.

Optionally, this embodiment of this application may be combined with the embodiments corresponding to FIG. 2A to FIG. 2H, and simultaneously combined with the embodiments corresponding to FIG. 3A to FIG. 3G. To be specific, the target sending time of the beacon frames on the two nonsimultaneous transmit and receive links in the multi-link device are the same, and are in the TWT service period. In addition, the sent beacon frame includes the groupcast indication information (and the broadcast indication information). That is, for example, in FIG. 4D, the second access point in the multi-link access point device sends the beacon frame on the second link in the TWT service period indicated by the TWT information unit, where the beacon frame includes the groupcast traffic indication (and the broadcast traffic indication). In this case, the multi-link station device may determine, based on the start time of the TWT service period, time of ending the TXOP, or end the TXOP of the first station at the time at which the second access point sends the beacon frame, and determine, based on whether there is the groupcast traffic and/or the broadcast traffic, to stop the channel contention or restart the channel contention, where whether there is the groupcast traffic and/or the broadcast traffic is indicated by the beacon frame.

Optionally, the multi-link access point device may configure the same TWT information unit for the first link and the second link, and further determine that the TWT service period on the first link is the same as the TWT service period on the second link. In the TWT service period, the first access point may determine, based on the time at which the second access point sends the beacon frame on the second link, the time of sending the beacon frame on the first link, and the multi-link station device determines, based on the time at which the beacon frame is sent on the first link, the time of ending the TXOP of the first station.

In this embodiment of this application, the time of sending the beacon frame by one link in the NSTR links of the multi-link device is determined based on the time of sending the beacon frame by the other link, and the time range corresponding to the beacon frame is determined by the TWT information unit. The sent beacon frame includes the groupcast traffic indication (and the broadcast traffic indication), and is used to indicate whether there is the to-be-received groupcast traffic. In this process, frequency of determining, by the access point, whether there is the to-be-sent beacon frame on the NSTR links and whether to end the transmit opportunity based on the status of the to-be-received traffic indicated by the beacon frame is reduced, accuracy of determining whether to end the transmit opportunity is improved, and channel access efficiency is improved.

Figure 5A:
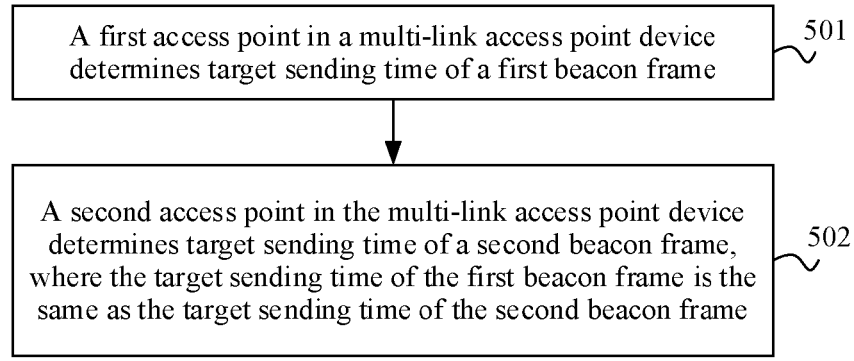
FIG. 5A is a flowchart of a communication method according to an embodiment of this application.

In some cases, in two NSTR links of a multi-link device, to avoid interference, caused by a link for sending data, to the other link for sending data, FIG. 5A is a flowchart of a communication method according to an embodiment of this application. As shown in FIG. 5A, to resolve this problem, the method includes the following steps.

501: A first access point in a multi-link access point device determines target sending time of a first beacon frame.

502: A second access point in the multi-link access point device determines target sending time of a second beacon frame, where the target sending time of the first beacon frame is the same as the target sending time of the second beacon frame.

Figure 5B:
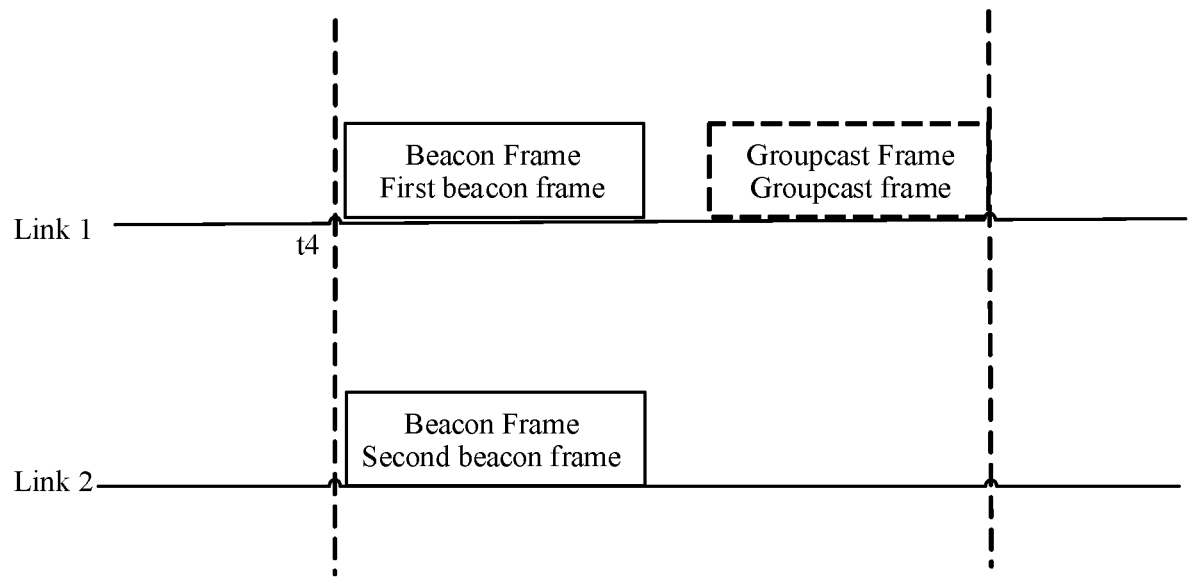
FIG. 5B is another schematic diagram of a communication process according to an embodiment of this application.

Specifically, a multi-link station device may learn of internal nonsimultaneous transmit and receive links. To avoid channel interference between the nonsimultaneous transmit and receive links, the same sending time of the beacon frame is configured for the two links by using the multi-link access point device. For example, a first station and a second station are stations in the multi-link station device, the first access point and the second access point are access points in the multi-link access point device, the first station communicates with the first access point on a first link (a link 1), and the second station communicates with the second access point on a second link (a link 2). The multi-link station device is an NSTR MLD. In addition, when the first station performs receiving on the link 1, the second station cannot perform sending on the link 2, or when the first station performs sending on the link 1, the second station cannot perform receiving on the link 2. In this case, FIG. 5B is another schematic diagram of a communication process according to an embodiment of this application. As shown in FIG. 5B, a multi-link access point device may configure same target sending time, namely, t4, for a first access point to send a first beacon frame and for a second access point to send a second beacon frame, so that time at which a multi-link station device receives the beacon frames on two nonsimultaneous transmit and receive links are synchronized, thereby effectively reducing a probability of causing channel interference, reducing duration for performing channel interference avoidance processing, and further reducing a channel access latency.

It should be noted that when the target sending time of the first beacon frame comes, a channel may be in a busy state. Therefore, actual sending time of the first beacon frame may be later than the target sending time of the first beacon frame. Similarly, actual sending time of the second beacon frame may be later than the target sending time of the second beacon frame.

In addition, this embodiment of this application may further include step 503: When the first access point and/or the second access point accesses a channel, end a transmit opportunity based on the time at which the first access point sends the first beacon frame on the corresponding first link or the time at which the second access point sends the second beacon frame on the corresponding second link.

Because the target sending time of the first beacon frame of the first access point in the multi-link access point device is the same as the target sending time of the second beacon frame of the second access point, if the TXOP has been obtained on the two links before the beacon frame is sent, the multi-link station device determines, based on the sending time of the respective beacon frame on the two links, the time at which the station on the link ends the TXOP, to receive the beacon frame on the link. If the beacon frame indicates that there is a to-be-received traffic frame on any link, the station on the other link stops channel contention.

Alternatively, if only the time at which the beacon frame is sent on one of the nonsimultaneous transmit and receive links can be obtained, because the time at which the beacon frame is sent on the two links are the same, the station on the other link also determines, based on the time at which the beacon frame is sent, the time of ending the TXOP.

It can be learned that, in this embodiment of this application, the multi-link access point device configures the same time of sending the beacon frame for the access points in the nonsimultaneous transmit and receive links, so that the beacon frames can be simultaneously sent on the two links, and the nonsimultaneous transmit and receive stations of the multi-link station device can simultaneously receive the beacon frames, thereby effectively preventing channel interference. Alternatively, when the station on the nonsimultaneous transmit and receive links obtains the TXOP, the nonsimultaneous transmit and receive station in the multi-link station device may alternatively determine, based on the time of sending the beacon frame, the same time of ending the TXOP, thereby further reducing a probability of channel interference, reducing duration for performing channel interference avoidance processing, and further reducing a channel access latency.

Optionally, this embodiment of this application may be combined with the embodiments corresponding to FIG. 3A to FIG. 3G. To be specific, the TWT service period may be determined by using the TWT information unit on the nonsimultaneous transmit and receive link in the multi-link station device. Both the time at which the first access point in the multi-link access point device sends the first beacon frame and the time at which the second access point sends the second beacon frame are within the TWT service period. In addition, both the sent first beacon frame and the sent second beacon frame are used to indicate whether there is the to-be-received groupcast traffic or the to-be-received broadcast traffic, so that the corresponding traffic is respectively processed on the two links in the dedicated service period, thereby reducing an impact of simultaneous frame sending on other traffic.

Optionally, this embodiment of this application may be combined with the embodiments corresponding to FIG. 2A to FIG. 2H. To be specific, the groupcast traffic indication (and the broadcast traffic indication) is sent by using the beacon frame, to indicate whether there is the to-be-received groupcast traffic, or used to indicate whether there is the to-be-received broadcast traffic. The beacon frame used to send the groupcast traffic indication (and the broadcast traffic indication) may be a same beacon frame as the first beacon frame or the second beacon frame in this embodiment, or may be a beacon frame sent after the first beacon frame and the second beacon frame. In this way, time for processing the groupcast traffic and the broadcast traffic on the first link and time for processing the groupcast traffic and the broadcast traffic on the second link can be more synchronized, thereby reducing a probability of channel interference.

Optionally, this embodiment of this application may be combined with the embodiments corresponding to FIG. 2A to FIG. 2H, and simultaneously combined with the embodiments corresponding to FIG. 3A to FIG. 3G. To be specific, the time at which the beacon frame is sent on the two links are the same, and are within the TWT service period. In addition, the sent beacon frame includes the groupcast traffic indication (and the broadcast traffic indication). In this way, the time range in which the groupcast traffic and the broadcast traffic are processed on the first link and the time of sending the traffic frame on the first link can be respectively more synchronized with the time range in which the groupcast traffic and the broadcast traffic are processed on the second link and the time of sending the traffic frame on the second link, thereby reducing a probability of channel interference.

The following describes in detail an apparatus provided in an embodiment of this application. An effect of reducing a channel access latency in link communication can be achieved by using the apparatus.

Figure 6:
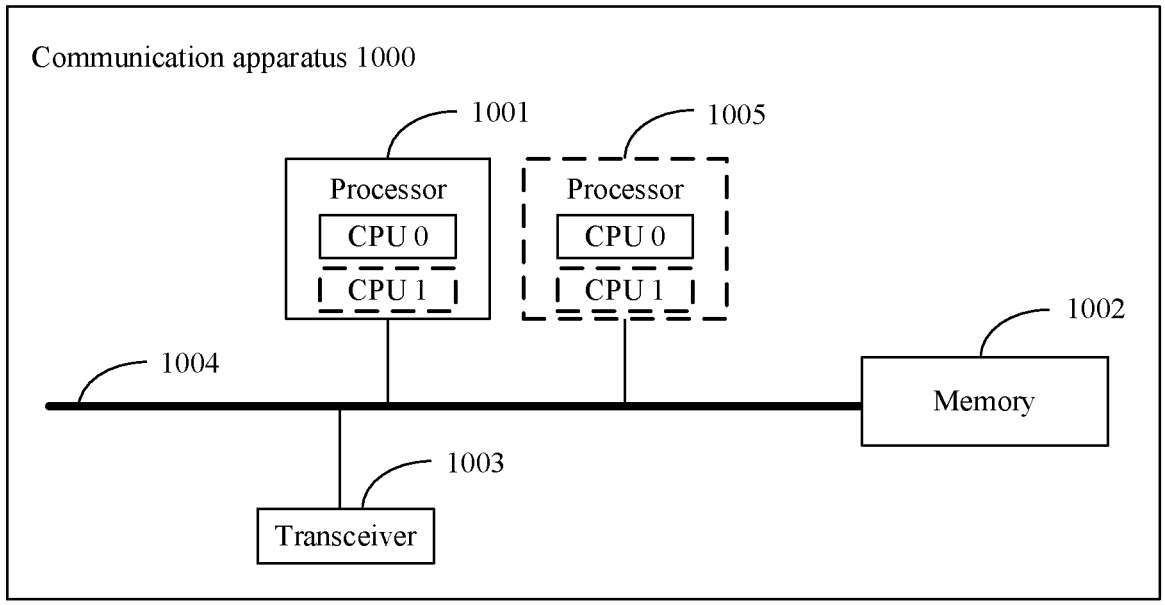
FIG. 6 is a schematic composition diagram of a communication apparatus according to an embodiment of this application.

FIG. 6 shows a communication apparatus 1000 according to an embodiment of this application. The apparatus may be the multi-link device in the foregoing embodiments, including the multi-link station device or the multi-link access point device, or may be a chip or a processing system in the multi-link station device or the multi-link access point device. The apparatus may implement the method and the function in any one of the foregoing embodiments. Due to different integration levels, the communication apparatus may include one or more of components shown in FIG. 6. The components shown in FIG. 6 may include at least one processor 1001, a memory 1002, a transceiver 1003, and a communication bus 1004.

The following specifically describes the components of the communication apparatus 1000 with reference to FIG. 6.

The processor 1001 is a control center of the communication apparatus 1000, and may be one processor or may be a collective term of a plurality of processing elements. For example, the processor 1001 is a central processing unit (CPU), an application-specific integrated circuit (ASIC), or one or more integrated circuits configured to implement this embodiment of this application, for example, one or more microprocessors (digital signal processors (DSPs)), or one or more field programmable gate arrays (FPGAs). The processor 1001 may perform various functions of the communication device by running or executing a software program stored in the memory 1002 and invoking data stored in the memory 1002. During specific implementation, in an embodiment, the processor 1001 may include one or more CPUs, for example, a CPU 0 and a CPU 1 shown in FIG. 6.

During specific implementation, in an embodiment, the communication apparatus woo may include a plurality of processors, such as the processor 1001 and a processor 1005 in FIG. 6. Each of the processors may be a single-core (single-CPU) processor or may be a multi-core (multi-CPU) processor. The processor herein may be one or more communication devices, circuits, and/or processing cores configured to process data (for example, a computer program instruction).

The memory 1002 may be a read-only memory (ROM) or another type of static storage communication device that can store static information and instructions; or a random access memory (RAM) or another type of dynamic storage communication device that can store information and instructions. The memory 1002 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 1002 may exist independently, and is connected to the processor 1001 by using the communication bus 1004. Alternatively, the memory 1002 may be integrated with the processor 1001. The memory 1002 is configured to store a software program for executing the solutions of this application, and the processor 1001 controls execution.

The transceiver 1003 is configured to communicate with another device (for example, a second device). Certainly, the transceiver 1003 may be further configured to communicate with a communication network, for example, the Ethernet, a radio access network (RAN), or a wireless local area network (WLAN). The transceiver 1003 may include a receiving unit for implementing a receiving function, and a sending unit for implementing a sending function.

The communication bus 1004 may be an industrial standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 6, but this does not mean that there is only one bus or only one type of bus.

In an example, the communication apparatus 1000 is a completely-built device. The communication apparatus may include the processor 1001, the memory 1002, the transceiver 1003, and the communication bus 1004, and optionally, may further include another component, for example, a display. Optionally, the communication apparatus 1000 is a first multi-link access point device or a first multi-link station device, and may be configured to implement the method or the function of the multi-link access point device or the multi-link station device in the embodiments corresponding to FIG. 2A to FIG. 2H, FIG. 3A to FIG. 3G, FIG. 4A to FIG. 4D, or FIG. 5A and FIG. 5B. For example, the memory stores instructions, and when the processor invokes the instructions, the foregoing method and the function are implemented. For example, the processor is configured to generate signaling or a frame, and the transceiver is configured to send the signaling or the frame. For example, the processor is configured to perform step 201 and step 203, step 301 and step 303, step 401 and step 402, or step 501 and step 502, and the transceiver is configured to perform step 202 and step 203, or step 302 and step 303.

In another example, the communication apparatus 1000 is a chip system or a processing system in a first multi-link access point device or a first multi-link station device, so that the device in which the chip system or the processing system is installed implements the method and the function in the embodiments corresponding to FIG. 2A to FIG. 2H, FIG. 3A to FIG. 3G, FIG. 4A to FIG. 4D, or FIG. 5A and FIG. 5B. In this case, the communication apparatus woo may include a part of the components shown in FIG. 6. For example, the communication apparatus woo includes a processor, and the processor may be coupled to a memory, and invoke and execute instructions in the memory. Therefore, the device on which the chip system or the processing system is installed is configured to implement the method and the function in the embodiments corresponding to FIG. 2A to FIG. 2H, FIG. 3A to FIG. 3G, FIG. 4A to FIG. 4D, or FIG. 5A and FIG. 5B. Optionally, the memory may be a component in the chip system or the processing system, or may be a component, connected in a coupling manner, outside the chip system or the processing system. In an example, the chip system or the processing system is installed in a first multi-link access point device or a first multi-link station device, so that the first multi-link access point device or the first multi-link station device can implement the method and the function in the embodiments corresponding to FIG. 2A to FIG. 2H, FIG. 3A to FIG. 3G, FIG. 4A to FIG. 4D, or FIG. 5A and FIG. 5B.

The chip system or the processing system may support 802.11 series protocols for communication, for example, support 802.11be, 802.11ax, and 802.11ac. The chip system may be installed in a device in various scenarios in which WLAN transmission is supported. The devices in the WLAN transmission scenario have been described in a beginning part of this specification, and details are not described herein again.

In the embodiments of this application, the first multi-link access point device or the first multi-link station device may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software function module. It should be noted that division into the modules is an example and is merely logical function division in the embodiments of this application. During actual implementation, another division manner may be used.

Figure 7:
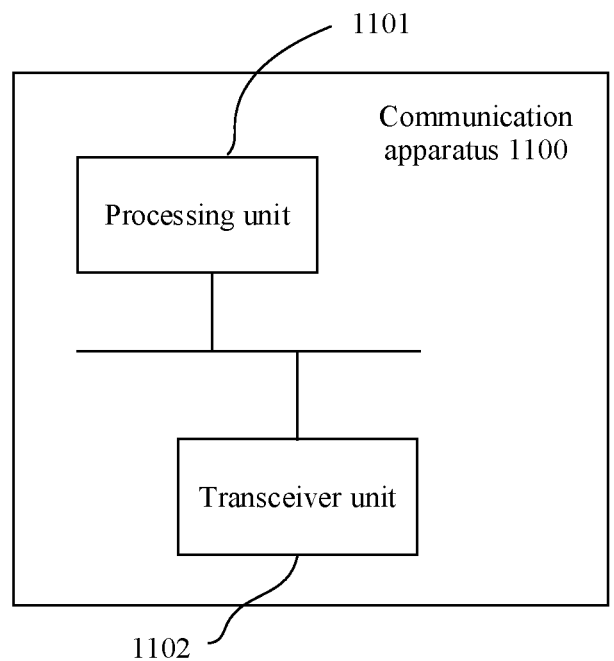
FIG. 7 is another schematic composition diagram of a communication apparatus according to an embodiment of this application.

When an integrated unit is used, FIG. 7 is a schematic diagram of a possible structure of a communication apparatus 1100. The communication apparatus 1100 may be a multi-link device or a chip or a processing system in the multi-link device, and the communication apparatus 1100 may perform the operation of the multi-link device in the foregoing method embodiments. The communication apparatus 1100 includes a processing unit 1101 and a transceiver unit 1102.

In an example, the communication apparatus 1100 is a first multi-link access point device or an access point in a first multi-link device.

The processing unit 1101 may be configured to control and manage an action of the communication apparatus 1100. For example, the processing unit 1101 generates a first beacon frame. For another example, the processing unit 1101 controls an operation of the transceiver unit 1102. Optionally, if the communication apparatus 1100 includes a storage unit, the processing unit 1101 may further execute a program or instructions stored in the storage unit, to enable the communication apparatus 1100 to implement the method and the function in any foregoing embodiment.

For example, the processing unit 1101 may be configured to perform, for example, step 201 and step 203 in FIG. 2A, step 301 and step 303 in FIG. 3A, step 401 and step 402 in FIG. 4A, or step 501 and step 502 in FIG. 5A, or another process for the technology described in this specification. All related content of the steps in the foregoing method embodiments may be cited in function description of corresponding functional modules. Details are not described herein again.

For example, the transceiver unit 1102 may receive and send data or signaling transmitted on one link, or may receive and send data or signaling transmitted on a plurality of links. Optionally, the transceiver unit 1102 may be one transceiver module, or may include a plurality of transceiver modules. When the transceiver unit 1102 is one transceiver module, the transceiver module may receive or send data on a plurality of links. For example, if the first multi-link access point device works on two links, when the transceiver unit 1102 includes two transceiver modules, one transceiver module works on one link, and the other transceiver module works on the other link. For example, the transceiver unit 1102 may be configured to perform, for example, step 202 and step 203 in FIG. 2A, step 302 and step 303 in FIG. 3A, and/or another process for the technology described in this specification. All related content of the steps in the foregoing method embodiments may be cited in function description of corresponding functional modules. Details are not described herein again.

For example, the communication apparatus 1100 may be the communication apparatus shown in FIG. 6, the processing unit 1101 may be the processor 1001 in FIG. 6, and the transceiver unit 1102 may be the transceiver 1003 in FIG. 6. Optionally, the communication apparatus 1100 may further include a memory. The memory is configured to store corresponding program code and data for the communication apparatus 1100 to perform any communication method between multi-link devices provided above. Description of all related content of the components in FIG. 6 may be cited in function description of corresponding components of the communication apparatus 1100, and details are not described herein again.

For example, the communication apparatus 1100 may alternatively be a chip or a processor. The processing unit 1102 is a processing circuit in the chip or the processor, and the transceiver unit 1102 may be an input/output circuit in the chip or the processor. The input/output circuit is an interface for mutual communication or data exchange between the chip or the processor and another coupled component, and can ensure that signaling, data information, or a program instruction is input into the chip or the processor for processing, output processed data or signaling to the another coupled component, and control a first multi-link device on which the chip or the processor is installed to implement a function.

In another example, the communication apparatus 1100 is a first multi-link station device or a station in the first multi-link station device.

For example, the processing unit 1101 may be configured to read indication information, and, for example, perform step 201 and step 203 in FIG. 2A, step 301 and step 303 in FIG. 3A, step 401 and step 402 in FIG. 4A, or step 501 and step 502 in FIG. 5A, and/or another process for the technology described in this specification. All related content of the steps in the foregoing method embodiments may be cited in function description of corresponding functional modules. Details are not described herein again.

For example, the transceiver unit 1102 may receive and send data or signaling transmitted on one link, or may receive and send data or signaling transmitted on a plurality of links. Optionally, the transceiver unit 1102 may be one transceiver module, or may include a plurality of transceiver modules. When the transceiver unit 1102 is one transceiver module, the transceiver module may receive or send data on a plurality of links. For example, if the first multi-link station device works on two links, when the transceiver unit 1102 includes two transceiver modules, one transceiver module works on one link, and the other transceiver module works on the other link. For example, the transceiver unit 1102 may be configured to perform, for example, step 202 and step 203 in FIG. 2A, step 302 and step 303 in FIG. 3A, and/or another process for the technology described in this specification. All related content of the steps in the foregoing method embodiments may be cited in function description of corresponding functional modules. Details are not described herein again.

For example, the communication apparatus 1100 may be the communication apparatus shown in FIG. 6, the processing unit 1101 may be the processor 1001 in FIG. 6, and the transceiver unit 1102 may be the transceiver 1003 in FIG. 6. Optionally, the communication apparatus 1100 may further include a memory. The memory is configured to store corresponding program code and data for the communication apparatus 1100 to perform any method provided above. Description of all related content of the components in FIG. 6 may be cited in function description of corresponding components of the communication apparatus 1100, and details are not described herein again.

For example, the communication apparatus 1100 may alternatively be a chip or a processor. The processing unit 1102 is a processing circuit in the chip or the processor, and the transceiver unit 1102 may be an input/output circuit in the chip or the processor. The input/output circuit is an interface for mutual communication or data exchange between the chip or the processor and another coupled component, and can ensure that signaling, data information, or a program instruction is input into the chip or the processor for processing, output processed data or signaling to the another coupled component, and control a device on which the chip or the processor is installed to implement a function.

An embodiment of this application further provides a computer-readable storage medium. The computer-readable storage medium stores computer program code. When a processor executes the computer program code, an electronic device performs the method according to any one of the embodiments in FIG. 2A to FIG. 2H, FIG. 3A to FIG. 3G, FIG. 4A to FIG. 4D, or FIG. 5A and FIG. 5B.

An embodiment of this application further provides a computer program product. When the computer program product is run on a computer, the computer is enabled to perform the method according to any one of the embodiments in FIG. 2A to FIG. 2H, FIG. 3A to FIG. 3G, FIG. 4A to FIG. 4D, or FIG. 5A and FIG. 5B.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method according to any one of the embodiments in FIG. 2A to FIG. 2H, FIG. 3A to FIG. 3G, FIG. 4A to FIG. 4D, or FIG. 5A and FIG. 5B.

An embodiment of this application further provides a communication system, including a first device and a second device. The first device and the second device may perform the method according to any one of the embodiments in FIG. 2A to FIG. 2H, FIG. 3A to FIG. 3G, FIG. 4A to FIG. 4D, or FIG. 5A and FIG. 5B.

The method or algorithm steps described with reference to the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or dedicated computer.

The objectives, technical solutions, and benefits of this application are further described in detail in the foregoing specific embodiments. It should be understood that the foregoing description is merely specific embodiments of this application, but are not intended to limit the protection scope of this application. Any modification, equivalent replacement or improvement made based on technical solutions of this application shall fall within the protection scope of this application.

What is claimed is:

1. A method, comprising:
   obtaining, by a first station in a multi-link station device, a channel on a first link through contention;
   obtaining, by the first station, a transmit opportunity (TXOP) on the first link;
   determining, by the first station, that a second station needs to receive a beacon frame at a target sending time on a second link, wherein the beacon frame is a groupcast or broadcast frame; and
   ending, by the first station, the TXOP before the target sending time of the beacon frame of the second station, wherein the second station is in the multi-link station device, and wherein, when the first station performs sending or receiving, the second station is not capable of performing receiving or sending, respectively.

2. The method according to claim 1, wherein the first link is between the first station and a first access point, and wherein the second link is between the second station and a second access point.

3. The method according to claim 2, wherein the first access point and the second access point belong to a same multi-link access point device.

4. The method according to claim 1, wherein the beacon frame indicates whether there is to-be-received broadcast or groupcast traffic.

5. The method according to claim 4, wherein the beacon frame further indicates a station having the to-be-received broadcast or groupcast traffic.

6. The method according to claim 1, the ending the TXOP comprising:
   relinquishing, by the first station, the TXOP before the target sending time of the beacon frame.

7. A first station, comprising:
   at least one processor; and
   a memory storing instructions for execution by the at least one processor, wherein, when executed, the instructions cause the first station to perform operations comprising:
   obtaining a channel on a first link through contention;
   obtaining a transmit opportunity (TXOP) on the first link;
   determining that a second station needs to receive a beacon frame at a target sending time on a second link, wherein the beacon frame is a groupcast or broadcast frame; and
   ending the TXOP before the target sending time of the beacon frame of the second station, wherein the first station and the second station are in a multi-link station device, and wherein, when the first station performs sending or receiving, the second station is not capable of performing receiving or sending, respectively.

8. The first station according to claim 7, wherein the first link is between the first station and a first access point, and wherein the second link is between the second station and a second access point.

9. The first station according to claim 8, wherein the first access point and the second access point belong to a same multi-link access point device.

10. The first station according to claim 7, wherein the beacon frame indicates whether there is to-be-received broadcast or groupcast traffic.

11. The first station according to claim 10, wherein the beacon frame further indicates a station having the to-be-received broadcast or groupcast traffic.

12. A chip system for a first station, comprising:
    a processing circuit; and
    an input/output interface, wherein the processing circuit is configured to perform:
    obtaining a channel on a first link through contention;
    obtaining a transmit opportunity (TXOP) on the first link;
    determining that a second station needs to receive a beacon frame at a target sending time on a second link, wherein the beacon frame is a groupcast or broadcast frame; and
    ending the TXOP before the target sending time of the beacon frame of the second station, wherein the first station and the second station are in a multi-link station device, and wherein, when the first station performs sending or receiving, the second station is not capable of performing receiving or sending, respectively.

13. The chip system according to claim 12, wherein the first link is between the first station and a first access point, and wherein the second link is between the second station and a second access point.

14. The chip system according to claim 13, wherein the first access point and the second access point belong to a same multi-link access point device.

15. The chip system according to claim 12, wherein the beacon frame indicates whether there is to-be-received broadcast or groupcast traffic, and wherein the beacon frame further indicates a station having the to-be-received broadcast or groupcast traffic.

* * * * *